US011613693B2

(12) United States Patent
Enomura et al.

(10) Patent No.: US 11,613,693 B2
(45) Date of Patent: Mar. 28, 2023

(54) METHOD OF PRODUCING ORGANIC PIGMENT COMPOSITION, METHOD OF PRODUCING COATING FILM, AND METHOD OF EVALUATING LUMINANCE OF COATING FILM

(71) Applicant: M. TECHNIQUE CO., LTD., Izumi (JP)

(72) Inventors: Masakazu Enomura, Izumi (JP); Daisuke Honda, Izumi (JP)

(73) Assignee: M. TECHNIQUE CO., LTD., Izumi (JP)

( * ) Notice: Subject to any disclaimer, the term of this patent is extended or adjusted under 35 U.S.C. 154(b) by 130 days.

(21) Appl. No.: 16/339,966

(22) PCT Filed: Oct. 10, 2017

(86) PCT No.: PCT/JP2017/036711
§ 371 (c)(1),
(2) Date: Apr. 5, 2019

(87) PCT Pub. No.: WO2018/066717
PCT Pub. Date: Apr. 12, 2018

(65) Prior Publication Data
US 2019/0284470 A1     Sep. 19, 2019

(30) Foreign Application Priority Data
Oct. 7, 2016  (JP) .............................. JP2016-199273

(51) Int. Cl.
*C09K 11/02*    (2006.01)
*C09D 5/22*     (2006.01)
(Continued)

(52) U.S. Cl.
CPC .......... *C09K 11/025* (2013.01); *C09B 67/006* (2013.01); *C09B 67/0097* (2013.01);
(Continued)

(58) Field of Classification Search
CPC ............ G02B 5/223; G02B 5/22; G02B 5/20; G02B 1/04; G02B 5/206; C09K 11/025; C09K 11/06; G01N 21/4738; C09D 5/22
See application file for complete search history.

(56) References Cited

U.S. PATENT DOCUMENTS 8,287,637 B2    10/2012  Carlini
2003/0116758 A1  6/2003  Morii et al.
(Continued)

FOREIGN PATENT DOCUMENTS

EP    1298185 A2    4/2003
EP    2 489 702 A1  8/2012
(Continued)

OTHER PUBLICATIONS

Peipei Yin, Gang Wu, Wenlong Qin, Xiaoqiang Chen, Mang Wang and Hongzheng Chen, CYM and RGB colored electronic inks based on silicacoated organic pigments for full-color electrophoretic displays, J. Mater. Chem. C, 2013, 1, 843-849. (Year: 2013).*
(Continued)

*Primary Examiner* — Bijan Ahvazi
(74) *Attorney, Agent, or Firm* — Birch, Stewart, Kolasch & Birch, LLP

(57) ABSTRACT

A method of producing an organic pigment composition including at least organic pigment microparticles, wherein a diffuse reflectance of the organic pigment microparticles is controlled for the purpose of improving a luminance of a color filter. The luminance of the color filter is controlled to be high, by controlling a ratio of an area of the diffuse reflectance in a target wavelength range to a total area of the diffuse reflectance in the entire measurement wavelength range in a diffuse reflection spectrum of the organic pigment microparticles in the wavelength range of 380 to 780 nm, to be high. The luminance of the color filter is controlled to be
(Continued)

high, by coating at least a part of the surface of the organic pigment microparticles with an oxide.

17 Claims, 4 Drawing Sheets

(51) Int. Cl.
  *G01N 21/47*  (2006.01)
  *G02B 5/20*  (2006.01)
  *C09K 11/06*  (2006.01)
  *G02B 1/04*  (2006.01)
  *G01N 21/27*  (2006.01)
  *C09B 67/20*  (2006.01)
  *C09B 67/02*  (2006.01)

(52) U.S. Cl.
  CPC ............... *C09D 5/22* (2013.01); *C09K 11/06* (2013.01); *G01N 21/27* (2013.01); *G01N 21/4738* (2013.01); *G02B 1/04* (2013.01); *G02B 5/20* (2013.01); *G02B 5/206* (2013.01)

(56)  References Cited

U.S. PATENT DOCUMENTS

| 2015/0110709 A1* | 4/2015 | Enomura ............ C09B 67/003 |
| | | 423/593.1 |
| 2018/0230310 A1 | 8/2018 | Enomura et al. |

FOREIGN PATENT DOCUMENTS

| JP | 2003-105226 A | 4/2003 |
|---|---|---|
| JP | 2007-177200 A | 7/2007 |
| JP | 2007-231247 A | 9/2007 |
| JP | 2008-268486 A | 11/2008 |
| JP | 2009-47936 A | 3/2009 |
| JP | 2009-112892 A | 5/2009 |
| JP | 2011-68837 A | 4/2011 |
| JP | 4668090-82 | 4/2011 |
| JP | 2014-126585 A | 7/2014 |
| JP | 2014-206618 A | 10/2014 |
| JP | 2016-61979 A | 4/2016 |
| JP | 2016-84458 A | 5/2016 |
| WO | WO 2011/096401 A | 8/2011 |
| WO | WO 2014/014199 A1 | 1/2014 |
| WO | WO-2016143437 A1 * | 9/2016 ............ C09D 11/10 |
| WO | WO 2017/047732 A1 | 3/2017 |

OTHER PUBLICATIONS

Junjie Yuan, Shuxue Zhou, Bo You, and Limin Wu, Organic Pigment Particles Coated with Colloidal Nano-Silica Particles via Layer-by-Layer Assembly Chem. Mater. 2005, 17, 3587-3594. (Year: 2005).*

International Search Report, issued in PCT/JP2017/036711, dated Dec. 12, 2017.

Extended European Search Report, dated Jun. 2, 2020, for European Application No. 17858553.5.

European Communication pursuant to Article 94(3) EPC for European Application No. 17858553.5, dated May 16, 2022.

Yuan et al., "The properties of organic pigment encapsulated with nano-silica via layer-by-layer assembly technique," Dyes and Pigments, vol. 76, 2608, pp. 463-469.

Korean Office Action for Korean Application No. 10-2019-7010120, dated Jun. 24, 2022, with an English translation.

* cited by examiner

METHOD OF PRODUCING ORGANIC PIGMENT COMPOSITION, METHOD OF PRODUCING COATING FILM, AND METHOD OF EVALUATING LUMINANCE OF COATING FILM

TECHNICAL FIELD

The present invention relates to a method of producing an organic pigment composition, a method of producing a coating film, a method of evaluating luminance of a coated film, and a method of producing a color filter. The present invention also relates to organic pigment microparticles for a color filter and a color filter.

BACKGROUND ART

Organic pigments are generally more durable than dyes and have higher coloring power than inorganic pigments. Therefore, organic pigments have been widely used as coloring materials, and various methods of producing them have been known.

A color filter can be shown as one of applications of such organic pigments. A color filter is used in a liquid crystal display device such as a liquid crystal display and an organic EL display, and in an imaging device used as an input device such as a digital camera and a color copy machine and the like. A color filter is produced by patterning each color by a method represented by a photolithography method using a mixture of a photosensitive resin composition and a pigment dispersion, and an inkjet method of directly coating a color ink on a substrate using an inkjet printer without masking.

For more vivid color reproduction, a color filter is strongly required to have high contrast, high luminance and transparency, and this tendency is especially strong in a color filter using an organic pigment. It is known that an organic pigment can achieve high contrast and improved transparency by making its particle have a smaller size and a spherical shape. Therefore, for example, Patent Literature 1 discloses that spherical and minute particles of an organic pigment can be obtained by dissolving the organic pigment in a good solvent such as an organic solvent, a strong acid and the like, and continuously adding the mixture to a poor solvent to be crystallized. In addition, a dispersion state of the organic pigment being the above microparticles also influences high contrast and transparency. A dispersing agent for the minute particles of the organic pigment and a wetting technique to the dispersion medium, are necessary for carrying out dispersion efficiently. High contrast and transparency in a color filter can be achieved by controlling a dispersion state (For example, Patent Literature 2).

However, even though high contrast and transparency in a color filter can be realized, high luminance has been actualized as a problem. Even if an organic pigment is spheroidized, and micronized, and a dispersion state in a dispersion medium is increased, they are not linked with a luminance. Nevertheless, regarding determination of high luminance of a color filter, there have not been any methods other than a method that actually a dispersion prepared by dispersing a spheroidized and micronized organic pigment in a solvent, is coated on glass or the like and baked (by heat treatment) to obtain a coating film, and the luminance of the obtained coating film is measured and determined.

Regarding high luminance of a color filter, there have been proposed a method using a pigment composition using a mixture of a pigment and a dye, and a method of improving a luminance by using a pigment composition in which dispersion stability of microparticles of a pigment containing a specific heterogeneous pigment is improved (Patent Literatures 3 and 4). However, a luminance of a coating film formed by baking was measured, and attention was not paid to color characteristics of an organic pigment itself. Since a luminance is evaluated by evaluation of a prepared dispersion and a coating film prepared by using the prepared dispersion, influence of characteristics of organic pigment microparticles themselves on a luminance cannot be correctly evaluated due to compatibility and the like with a resin, dispersing agent, or another subcomponent contained in the coating film. Therefore, fundamental factors for controlling a luminance of a color filter could not be specified. Since a luminance of organic pigment microparticles themselves could not be controlled, it was not possible to fundamentally control high luminance of a color filter, and establishment of a control method concerning high luminance of a color filter has been desired.

CITATION LIST

Patent Literature

Patent Literature 1: WO 2011/096401
Patent Literature 2: JP 2014-126585
Patent Literature 3: JP 2008-268486
Patent Literature 4: JP 2016-61979

SUMMARY OF THE INVENTION

Technical Problem

In view of such circumstances, an object of the present invention is to provide a method of producing an organic pigment composition comprising at least organic pigment microparticles with controlled diffuse reflectance for the purpose of improving a luminance of a color filter. The inventors of the present application have found the relation between a diffuse reflectance of the organic pigment microparticles and a luminance of a color filter of a coating film prepared using the organic pigment microparticle dispersion, and that high luminance of a color filter can be realized by controlling a diffuse reflectance of the organic pigment microparticles, and thus have accomplished the present invention.

Further, in view of the above circumstances, an object of the present invention is to provide a method of producing a coating film prepared using an organic pigment microparticle dispersion as an organic pigment composition, a method of evaluating a luminance of a coating film, and a method of producing a color filter comprising a step of forming a coating film on a substrate for a color filter.

Further, in view of the above circumstances, an object of the present invention is to provide organic pigment microparticles for a color filter, and a color filter comprising the organic pigment microparticles for a color filter.

Solution to the Problem

That is, the present invention provides a method of producing an organic pigment composition comprising at least organic pigment microparticles, wherein a diffuse reflectance of the organic pigment microparticles is controlled for the purpose of improving a luminance of a color filter.

In the present invention, it is preferable that the luminance of the color filter is controlled to be high, by controlling a ratio of an area of the diffuse reflectance in a target wavelength range to an total area of the diffuse reflectance in the entire measurement wavelength range in a diffuse reflection spectrum of the organic pigment microparticles in the wavelength range of 380 to 780 nm, to be high. In the present invention, it is preferable that the luminance of the color filter is controlled to be high, by coating at least a part of the surface of the organic pigment microparticles with an oxide. In the present invention, it is preferable that the oxide contains an amorphous oxide. In the present invention, it is preferable that the oxide is silicon oxide. In the present invention, it is preferable to measure the diffuse reflection spectrum using powders of the organic pigment microparticles.

Further, in the present invention, it is preferable that when the organic pigment microparticles are red pigment microparticles, the target wavelength range is 620 to 750 nm, and the ratio of an area of the diffuse reflectance in the target wavelength range to an total area of the diffuse reflectance in the entire measurement wavelength range is 71% or more. It is preferable that when the organic pigment microparticles are blue pigment microparticles, the target wavelength range is 450 to 495 nm, and the ratio of an area of the diffuse reflectance in the target wavelength range to a total area of the diffuse reflectance in the entire measurement wavelength range is 30% or more. It is preferable that when the organic pigment microparticles are green pigment microparticles, the target wavelength range is 495 to 570 nm, and the ratio of an area of the diffuse reflectance in the target wavelength range to a total area of the diffuse reflectance in the entire measurement wavelength range is 51% or more.

Further, the present invention can be carried out as a method of producing an organic pigment composition, wherein the organic pigment composition is an organic pigment microparticle dispersion, and the method comprises the following steps (I) to (III):
Step (I) of obtaining at least one kind of organic pigment microparticles;
Step (II) of measuring a diffuse reflectance of the organic pigment microparticles; and
Step (III) of dispersing the organic pigment microparticles in a solvent to obtain the organic pigment microparticle dispersion.

Further, the present invention can be carried out as a method of producing a coating film, wherein a coating film is prepared using the organic pigment microparticle dispersion obtained by the method of producing an organic pigment composition comprising the above steps (I) to (III), and a luminance of the coating film is controlled. It is preferable that a luminance of the coating film is controlled by controlling a diffuse reflectance of the organic pigment microparticles.

In addition, the present invention provides a method of evaluating a luminance of a coating film prepared using an organic pigment microparticle dispersion, wherein a diffuse reflectance of powders of organic pigment microparticles is measured, and the luminance of the coating film is evaluated by using the following relation obtained by the following steps (I) to (IV):
Step (I) of obtaining at least one kind of organic pigment microparticles;
Step (II) of measuring the diffuse reflectance of the powders of the organic pigment microparticles in the wavelength range of 380 to 780 nm;
Step (III) of dispersing the organic pigment microparticles in a solvent to obtain the organic pigment microparticle dispersion; and
Step (IV) of measuring a luminance of the coating film prepared using the organic pigment microparticle dispersion, to obtain the relation between the luminance of the coating film and a ratio of an area of the diffuse reflectance in the target wavelength range to a total area of the diffuse reflection in the entire measurement wavelength range.

The present invention also provides an organic pigment composition comprising at least organic pigment microparticles, wherein a diffuse reflectance of the organic pigment microparticles is controlled for the purpose of controlling luminance of a color filter.

The present invention further provides a method of producing a color filter, comprising a step of forming the coating film on a substrate for a color filter, in the above method of producing a coating film, to obtain the color filter whose luminance is controlled by controlling the diffuse reflectance of the organic pigment microparticles.

The present invention provides organic pigment microparticles for a color filter, wherein the organic pigment microparticles are red pigment microparticles, and a ratio of an area of a diffuse reflectance in the target wavelength range to an total area of a diffuse reflectance in the entire measurement wavelength range is 71% or more, in a diffuse reflection spectrum of the organic pigment microparticles in the wavelength range of 380 to 780 nm, and the target wavelength range is 620 to 750 nm.

The present invention also provides organic pigment microparticles for a color filter, wherein the organic pigment microparticles are blue pigment microparticles, and a ratio of an area of a diffuse reflectance in the target wavelength range to an total area of a diffuse reflectance in the entire measurement wavelength range is 30% or more, in a diffuse reflection spectrum of the organic pigment microparticles in the wavelength range of 380 to 780 nm, and the target wavelength range is 450 to 495 nm.

The present invention also provides organic pigment microparticles for a color filter, wherein the organic pigment microparticles are green pigment microparticles, and a ratio of an area of a diffuse reflectance in the target wavelength range to an total area of a diffuse reflectance in the entire measurement wavelength range is 51% or more, in a diffuse reflection spectrum of the organic pigment microparticles in the wavelength range of 380 to 780 nm, and the target wavelength range is 495 to 570 nm.

Further, in the present invention, it is preferable that at least a part of the surface of the organic pigment microparticles is coated with silicon oxide. The silicon oxide preferably contains an amorphous silicon oxide.

In addition, the present invention provides a color filter comprising the above organic pigment microparticles for a color filter.

The present invention also provides a color filter comprising the above organic pigment microparticles for a color filter and organic pigment microparticles having a color different from the color of the organic pigment microparticles. Here, the organic pigment microparticles having a color different from the color of the organic pigment microparticles may be any organic pigment microparticles having a color different from the color of the above organic pigment microparticles for a color filter, for example, organic pigment microparticles having a complementary color.

The above color filter may have both high diffuse reflectance and high luminance, compared with a color filter obtained using bead milled organic pigment microparticles. Here, the bead milled organic pigment microparticles refer to organic pigment microparticles obtained by pulverizing and micronizing an organic pigment used as a raw material in preparing organic pigment microparticles for a color filter by means of a bead mill.

Advantageous Effects of the Invention

According to the present invention, it is possible to obtain an organic pigment composition whose luminance of a color filter is controlled, and thereby it is possible to produce a color filter with high luminance using the organic pigment composition. It is not necessary to perform actual coating film formation and evaluation for all target pigment microparticles, in order to evaluate a luminance of the organic pigment microparticles as a color filter as in the past. Therefore, it is possible to simplify development of color filters, and it is possible to reduce time and cost by not performing coating film formation for evaluation.

Further, the present invention can provide a novel method of producing a coating film prepared using the organic pigment composition, and a method of effectively evaluating a luminance of a coating film.

The present invention can also provide a method of producing a color filter utilizing a new knowledge concerning the relation between a diffuse reflectance of organic pigment microparticles and a luminance of a color filter.

Furthermore, the present invention can provide organic pigment microparticles for a color filter, and a color filter comprising the organic pigment microparticles for a color filter, utilizing the above new knowledge.

DESCRIPTION OF THE INVENTION

Figure 1:
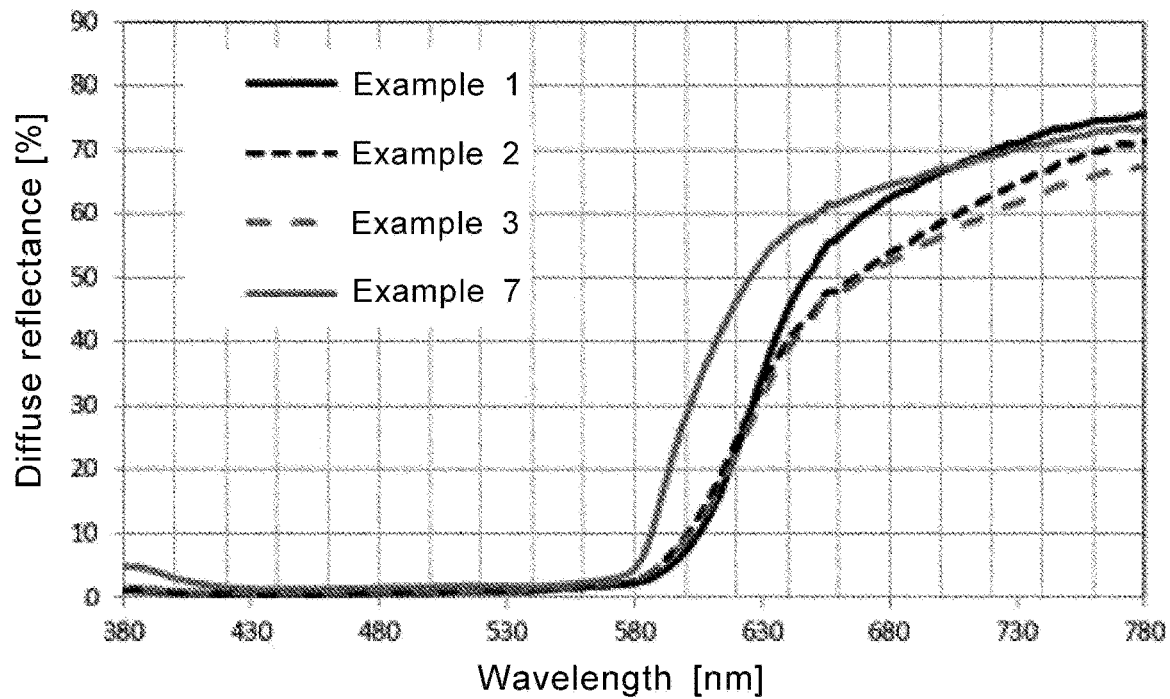
FIG. 1 shows a measurement result of a diffuse reflection spectrum of the PR 254 microparticle powders obtained in Examples 1, 2, 3 and 7 of the present invention.

Hereinafter, embodiments of the present invention are explained with reference to the drawings. It should be noted that embodiments of the present invention are not limited to only the embodiments described below.

(Microparticles)

In the present invention, microparticles refer to minute particles having a primary particle diameter of 500 nm or less, preferably 100 nm or less, or more preferably 30 nm or less. Form of the particles or microparticles is not particularly limited, but may be, for example, particles in a form of a substantially columnar shape, a substantially spherical shape, a substantially disk shape, a substantially triangular prism shape, a substantially quadrangular prism shape, a substantially polyhedral shape, an elliptical spherical shape, or the like, or aggregates thereof.

(Organic Pigment)

An organic pigment in the present invention is not particularly limited. Examples of the organic pigments include all organic pigments registered in The Society of Dyers and Colorists. Among these colors, an organic pigment constituting a green color includes, for example, an organic pigment classified into C. I. Pigment Green; an organic pigment constituting a blue color includes, for example, an organic pigment classified into C. I. Pigment Blue; an organic pigment constituting a white color includes, for example, an organic pigment classified into C. I. Pigment White; an organic pigment constituting a yellow color includes, for example, an organic pigment classified into C. I. Pigment Yellow; an organic pigment constituting a red color includes, for example, an organic pigment classified into C. I. Pigment Red in the Color Index, an organic pigment classified into C. 1. Pigment Violet or C. I. Pigment Orange, and the like. More specific examples include a quinacridone pigment such as C. 1. Pigment Red 122 and C. I. Pigment Violet 19; a diketopyrrolopyrrole pigment such as C. 1. Pigment Red 254 and C. I. Pigment Orange 73; a naphthol pigment such as C. I. Pigment Red 150 and C. I. Pigment Red 170; a perylene pigment such as C. I. Pigment Red 123 and C. I. Pigment Red 179; and an azo pigment such as C. I. Pigment Red 144, a phthalocyanine organic pigment such as C. I. Pigment Blue 15:1, C. 1. Pigment Blue 15:2. C. I. Pigment Blue 15:3, C. I. Pigment Blue 15:6, C. I. Pigment Green 36, C. I. Pigment Green 58, and the like. The production method of the present invention can also be carried out by using a newly synthesized organic pigment. The above organic pigments may be used alone or in combination of two or more.

In the present invention, it is preferable to obtain organic pigment microparticles by mixing an organic pigment solution obtained by dissolving an organic pigment as a raw material of the target organic pigment microparticles in a good solvent and a precipitation solvent such as a poor solvent for precipitating the organic pigment microparticles from the organic pigment solution, to precipitate the organic pigment microparticles, using a reaction such as a poor solvent method, an acid paste method, an alkali paste method or the like. The organic pigment microparticles may be prepared by pulverizing the organic pigment by a pulverization method such as a bead mill.

The organic pigment microparticles may be the same as or different from the organic pigment used as the raw material of the organic pigment microparticles. For example, when a raw material of the organic pigment microparticles is C. I. Pigment Red 254 (hereinafter referred to as PR 254), the organic pigment microparticles precipitated by mixing a PR 254 solution prepared by dissolving PR 254 in a good solvent and a precipitation solvent, may be microparticles of PR 254. When raw materials of the organic pigment microparticles are two or more kinds of organic pigments, the organic pigment microparticles precipitated by mixing an organic pigment solution obtained by dissolving the two or more kinds of the organic pigments in a good solvent and a precipitation solvent, may be microparticles of a solid solution of the two or more different organic pigments as described above.

(Organic Pigment Solution or Precipitation Solvent)

A good solvent for dissolving the organic pigment, or a precipitation solvent such as a poor solvent for precipitating the organic pigment microparticles from an organic pigment solution by mixing with the organic pigment solution, is not particularly limited, as long as it is a solvent capable of dissolving or dispersing the organic pigment, or a solvent capable of precipitating the organic pigment microparticles from the organic pigment solution by mixing with the organic pigment solution. For example, the solvents include water, an organic solvent, or a mixed solvent composed of a plurality thereof. The water includes tap water, ion exchange water, pure water, ultrapure water, RO water and the like. The organic solvent includes, an alcohol solvent, an amide solvent, a ketone solvent, an ether solvent, an aromatic compound solvent, carbon disulfide, an aliphatic compound solvent, a nitrile solvent, a sulfoxide solvent, a halogen compound solvent, an ester solvent, an ionic liquid, a carboxylic acid compound, a sulfonic acid compound and the like. Each of the above solvents may be used alone, or a plurality of them may be mixed and used. Here, the good solvent refers to a solvent that can be a good solvent for an organic pigment, and the poor solvent refers to a solvent that has lower solubility of an organic pigment than the good solvent and can be a poor solvent for the organic pigment.

It can also be carried out by mixing or dissolving a basic substance or an acidic substance in the organic pigment solution or the precipitation solvent. A basic substance includes a metal hydroxide such as sodium hydroxide and potassium hydroxide, a metal alkoxide such as sodium methoxide and sodium isopropoxide, a quarternary ammonium hydroxide such as tetrabutyl ammonium hydroxide and benzyltrimethyl ammonium hydroxide, an amine compound such as triethylamine, 2-diethylaminoethanol and diethylamine and the like. An acidic substance includes an inorganic acid such as aqua regia, hydrochloric acid, nitric acid, fuming nitric acid, sulfuric acid, fuming sulfuric acid, chlorosulfuric acid, and an organic acid such as formic acid, acetic acid, chloroacetic acid, dichloroacetic acid, oxalic acid, trifluoroacetic acid, trichloroacetic acid and the like. These basic substances or acidic substances can be mixed with various solvents as described above and can be used alone.

The method of producing an organic pigment composition of the present invention, controls a diffuse reflectance of the organic pigment microparticles, and controls a luminance which is one of the characteristics of a color filter obtained by using the organic pigment composition containing at least the organic pigment microparticles.

The organic pigment composition of the present invention comprises at least organic pigment microparticles, for example, powders of the organic pigment microparticles, a dispersion in which the organic pigment microparticles are dispersed in a solvent of a liquid dispersion medium, a dispersion in which the organic pigment microparticles are dispersed in a solid such as glass or resin, etc. In the organic pigment microparticles for a color filter of the present invention, the organic pigment microparticles having a primary particle diameter of 200 nm or less are preferable, and the organic pigment microparticles having a primary particle diameter of 100 nm or less are more preferable.

In the case that the organic pigment composition is an organic pigment microparticle dispersion in which the organic pigment microparticles are dispersed in a solvent of a liquid dispersion medium, a liquid dispersion medium is used as a dispersion medium. A liquid dispersion medium is preferably an organic solvent, more preferably an alcohol solvent such as methanol, ethanol, isopropyl alcohol and the like, a polyhydric alcohol solvent such as propylene glycol, ethylene glycol, diethylene glycol, glycerin and the like, an ester solvent such as ethyl acetate, butyl acetate and the like, an aromatic solvent such as benzene, toluene, xylene and the like, a ketone solvent such as acetone, methyl ethyl ketone and the like, a nitrile solvent such as acetonitrile and the like, and the like. From the viewpoint of dispersibility of the organic pigment microparticles, an ester solvent is preferable, and propylene glycol monomethyl ether acetate and propylene glycol monomethyl ether are more preferable. These solvents may be used alone or in combination of two or more.

In the case that the organic pigment composition is an organic pigment microparticle dispersion, the content of the organic pigment microparticles in the organic pigment composition is preferably 1.0 to 30.0 wt %, more preferably 5.0 to 20.0 wt % from the viewpoint of forming a dispersion for a color filter.

A content of the liquid dispersion medium in the organic pigment composition is preferably 70.0 to 99.0 wt %, more preferably 80.0 to 95.0 wt % from the viewpoint of forming a dispersion for a color filter.

In the present invention, in the case that the organic pigment composition is an organic pigment microparticle dispersion, the organic pigment microparticle dispersion can be obtained by adding the organic pigment microparticles into a liquid dispersion medium and performing dispersion treatment. A method of dispersion treatment and a dispersing apparatus used are not particularly limited, but it is possible to perform dispersion treatment by using the same apparatus as used in the preparation of various solutions and solvents in the present invention.

Further, if necessary, a dispersing agent may be added to the organic pigment composition. A dispersing agent is not particularly limited, and examples thereof include a resin type dispersing agent, a surfactant type dispersing agent, and the like. Among them, a resin type dispersing agent is preferable from the viewpoint of sufficiently exhibiting a pigment dispersion effect, a pigment reaggregation suppressing effect, and the like in order to prepare the organic pigment composition for evaluating characteristics of a color filter. A resin type dispersing agent is not particularly limited, but examples thereof include an oily resin type dispersing agent such as a polyurethane, a polyester, an unsaturated polyamide, a phosphate ester, a polycarboxylic acid and an amine salt thereof, an ammonium salt thereof, an alkylamine salt thereof, a polycarboxylic acid ester, a hydroxyl group containing polycarboxylic acid ester, a polysiloxane, modified polyacrylate, and the like; a water-soluble resin type dispersing agent such as a water-soluble polymer compound such as an alginic acid, a polyvinyl alcohol, a hydroxypropyl cellulose, a carboxymethyl cellulose, a hydroxyethyl cellulose, a methyl cellulose, a polyvinyl pyrrolidone, gum arabic, and the like; an ethylenic double bond containing resin such as a styrene-acrylic acid resin, a styrene-methacrylic acid resin, a styrene-acrylic acid-acrylic acid ester resin, a styrene-maleic acid resin, a styrene-maleic acid ester resin, a methacrylic acid-methacrylic acid ester resin, an acrylic acid-acrylic acid ester resin, an isobutylene-maleic acid resin, a vinyl-ester resin, a rosin modified maleic acid resin, and the like; an amine resin such as polyallylamine, polyvinylamine, polyethyleneimine and the like, and the like.

Various types of resin type dispersing agents are commercially available. Specific examples of commercially available products include "Solsperse" 3000, 9000, 13240, 17000, 20000, 24000, 26000, 28000, 32000, 32500, 41000 (all product names: Lubrizol Japan), "Disperbyk-" 108, 110, 112, 140, 142, 145, 161, 162, 163, 164, 166, 167, 182, 2000, 2001, 2050, 2070, 2150, "BYK LPN-" 6919, 21116 (all product names: BYK Chemie Japan), "EFKA-" 4401, 4403, 4406, 4010, 4015, 4046, 4047, 4050, 4055, 4060, 4080, 5064, 5207, 5244 (all product names: EFKA Additives), "AJISPER" PB 821(F), PB 822, PB 880 (all product names: Ajinomoto Fine-Techno Co., Ltd.), Hinoact T-8000 (product name: Kawaken Fine Chemicals Co., Ltd.), Disparon PW-36, "Disparon DA-" 325, 375, 7301 (all product names: Kusumoto Chemicals, Ltd.), and the like. Among the resin type dispersing agents, those having a weight average molecular weight of about 1,000 to 30,000 are preferable.

A surfactant type dispersant is not particularly limited, but examples thereof include an anionic surfactant such as a naphthalenesulfonic acid formalin condensate salt, an aromatic sulfonic acid formalin condensate, a polyoxyethylene alkyl phosphate ester, and the like, a nonionic surfactant such as a polyoxyethylene alkyl ether, and the like, a cationic surfactant such as an alkylamine salt, a quaternary ammonium salt, and the like, and the like. Various surfactant type dispersing agents are commercially available, and specific examples thereof include "Demol" N, RN, MS, SN-B, "Emulgen" 120, 430, "Acetamine" 24, 86, Qurtamin 24P (all product names: Kao Corporation), "Plysurf" AL, A208F (all product names: DSK Co., Ltd.), "Arquad" C-50, T-28, T-50 (all product names: Lion Corporation), and the like.

One kind of a pigment dispersing agent can be used alone, or two or more types can be used in combination. A content of the dispersing agent in the organic pigment microparticles in the organic pigment composition is preferably 1 to 25 parts by weight, more preferably 3 to 20 parts by weight, relative to 100 parts by weight of the organic pigment microparticles from the viewpoint of characteristics of a color filter.

FIG. 1 shows a diffuse reflection spectrum in the wavelengths of 380 to 780 nm measured using the microparticle powders of C. I. Pigment Red 254 of red diketopyrrolopyrrole pigment prepared under the conditions in Examples 1, 2, 3 and 7 of the present invention.

In the present invention, a luminance of a color filter produced using the organic pigment microparticles can be controlled by controlling a ratio of an area of a diffuse reflectance in the target wavelength range to a total area of a diffuse reflectance in the entire measurement wavelength range (wavelengths of 380 to 780 nm) of the powders of the organic pigment microparticles (a ratio of an area of a diffuse reflectance in the target wavelength range: DiR [%]). More specifically, when a ratio of an area of a diffuse reflectance in a target wavelength range to a total area of a diffuse reflectance in the entire measurement wavelength range (wavelengths of 380 to 780 nm) of the powders of the organic pigment microparticles (a ratio of an area of a diffuse reflectance in the target wavelength range: DiR [%]) is higher, then, a luminance of a color filter produced using the organic pigment microparticles is higher, which is controlled in the present invention. Here, the area of a diffuse reflectance refers to an integral value of a diffuse reflectance over the entire measurement wavelength range or the target wavelength range, obtained by measurement of a diffuse reflectance in the wavelengths of 380 to 780 nm.

For example, in the case of using PR 254 as a red pigment to be used for a color filter, a luminance of a color filter produced using the organic pigment microparticles can be controlled by controlling a ratio of an area of a diffuse reflectance in the wavelengths of 620 to 750 nm that is important for a red color filter, to a total area of a diffuse reflectance in the entire measurement wavelength range (wavelengths of 380 to 780 nm) of the powders of the organic pigment microparticles.

Figure 2:
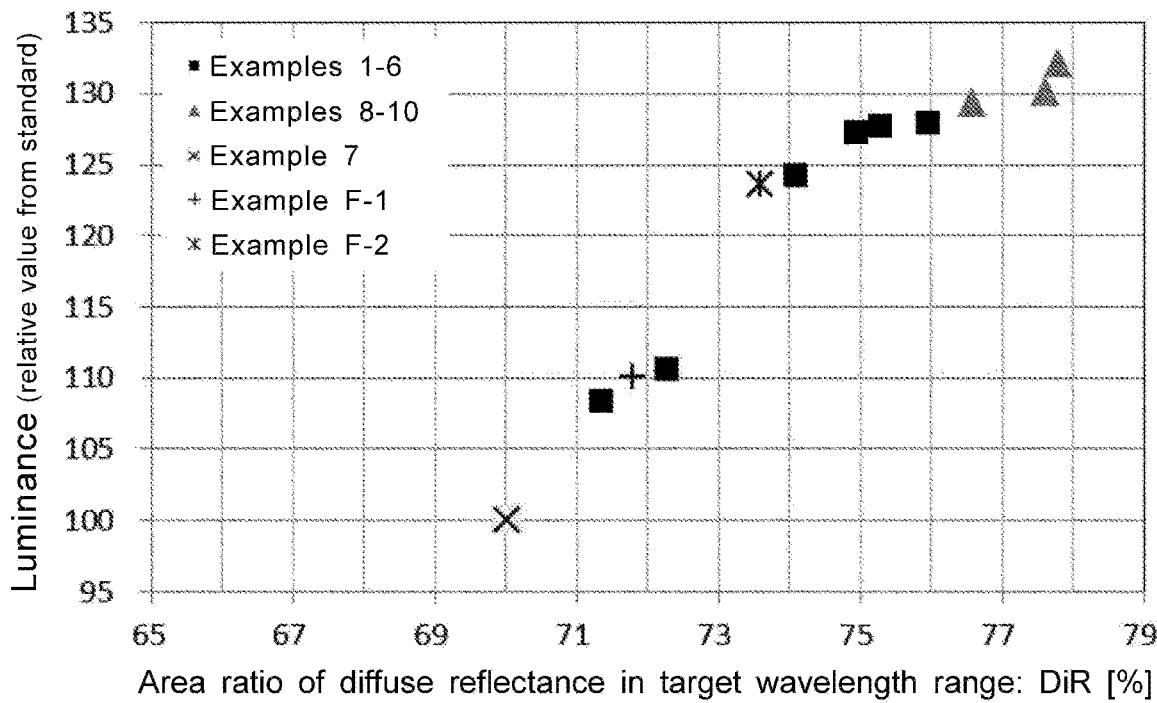
FIG. 2 shows a graph of a luminance in the color filter characteristic evaluation with regards to a ratio of an area of a diffuse reflectance in the target wavelength range (DiR) [%] of the PR 254 microparticle powders or the silicon oxide coated PR 254 microparticle powders obtained in Examples 1 to 10, Examples F-1 and F-2 of the present invention.

A ratio of an area of a diffuse reflectance in the wavelength 620 to 750 nm to a total area of a diffuse reflectance in the entire measurement wavelength range (wavelengths of 380 to 780 nm) of the PR 254 microparticles obtained in Examples was, as shown in FIG. 1, 75.94% for Example 1, 75.27% for Example 2, 74.94% for Example 3, and 70.01% for Example 7. A relative luminance value as compared to 100 for a luminance of Example 7, was 128.00 for Example 1, 127.80 for Example 2, and 127.33 for Example 3. These results indicate that a luminance of a color filter can be controlled to be high, by controlling a ratio of an area of a diffuse reflectance in the wavelengths of 620 to 750 nm that is important for a red color filter, to a total area of a diffuse reflectance in the entire measurement wavelength range (wavelengths of 380 to 780 nm) to be high. FIG. 2 shows a graph of a luminance with regards to a ratio of an area of a diffuse reflectance in the wavelength range of 620 to 750 nm to a total area of a diffuse reflectance in the entire measurement wavelength range of the wavelengths of 380 to 780 nm (a ratio of an area of a diffuse reflectance in the target wavelength range: DiR [%]), of the PR 254 microparticles produced in the conditions of Examples including the following Examples. As seen from FIG. 2, a luminance of a color filter can be controlled to be high, by controlling a ratio of an area of a diffuse reflectance in the wavelengths of 620 to 750 nm that is important for a red color filter, to a total area of a diffuse reflectance in the entire measurement wavelength range (wavelengths of 380 to 780 nm) to be high.

Thus, in the case that a pigment used for a color filter is a red pigment, a luminance of the color filter produced using the organic pigment microparticles can be controlled, by setting a target wavelength range to wavelengths of 620 to 750 nm, and controlling a ratio of an area of a diffuse reflectance in the wavelengths of 620 to 750 nm that is important for a red color filter, to an total area of a diffuse reflectance in the entire measurement wavelength range (wavelengths of 380 to 780 nm) of the powders of the organic pigment microparticles. Similarly, in the case that a pigment used for a color filter is a blue pigment, a luminance of the color filter produced using the organic pigment microparticles can be controlled, by setting a target wavelength range to wavelengths of 450 to 495 nm, and controlling a ratio of an area of a diffuse reflectance in the wavelengths of 450 to 495 nm that is important for a blue color filter, to an total area of a diffuse reflectance in the entire measurement wavelength range (wavelengths of 380 to 780 nm) of the powders of the organic pigment microparticles. In the case that a pigment used for a color filter is a green pigment, a luminance of the color filter produced using the organic pigment microparticles can be controlled, by setting a target wavelength range to wavelengths of 495 to 570 nm, and controlling a ratio of an area of a diffuse reflectance in the wavelengths of 495 to 570 nm that is important for a green color filter, to an total area of a diffuse reflectance in the entire measurement wavelength range (wavelengths of 380 to 780 nm) of the powders of the organic pigment microparticles.

Further, in the case that organic pigment microparticles are red pigment microparticles, a ratio of an area of a diffuse reflectance in the target wavelength range to an total area of a diffuse reflectance in the entire measurement wavelength range (wavelengths of 380 to 780 nm) (a ratio of an area of a diffuse reflectance in the target wavelength range: DiR [%]) of the powders of the organic pigment microparticles, is preferably 67% or more, more preferably 71% or more, and further preferably 76% or more. In the case that organic pigment microparticles are blue pigment microparticles, the ratio is preferably 26% or more, more preferably 30% or more, and further preferably 32% or more. In the case that organic pigment microparticles are green pigment microparticles, the ratio is preferably 46% or more, more preferably 51% or more, further preferably 52% or more.

When a ratio of an area of a diffuse reflectance in the target wavelength range to an total area of a diffuse reflectance in the entire measurement wavelength range (wavelengths of 380 to 780 nm) (a ratio of an area of a diffuse reflectance in the target wavelength range: DiR [%]) of the powders of the organic pigment microparticles of each color, is lower than 71% for a red color, lower than 30% for a blue color, or lower than 51% for a green color respectively, then, a luminance of a color filter may tend to decrease due to the following reason. Therefore, it is preferable that each ratio is not less than the above mentioned numerical value, for obtaining a color filter having a high luminance.

In the technique relating to a color filter which is known today, not only organic pigment microparticles having a main color of a color filter of each intended color, but also organic pigment microparticles having a different color (for example, complementary color) may be used in combination, even in color filters of red, blue and green. This technique can also be applied to the present invention, and organic pigment microparticles having a different color can also be used in addition to organic pigment microparticles having a main color, to produce a color filter. An amount of the organic pigment microparticles having a different color is generally suitably less than an amount of the organic pigment microparticles having a main color.

A diffuse reflectance in the present invention is a ratio of a light diffusely reflected as a scattered light to an incident light of a specific wavelength, and specular reflection components out of the reflected light is excluded from the reflected light. Therefore, a diffuse reflectance can be thought of as a parameter affecting a color actually detected by vision or a detector. Since coloration is shown in a color filter by transmitting a light of a target wavelength through a coating film of an organic pigment composition, a transmission spectrum of a coating film or a dispersion of an organic pigment composition has been mostly discussed up to now. However, a transmittance obtained by a transmission spectrum measurement shows only how much an amount of an incident light of a specific wavelength passes through the coating film, and thus was insufficient as an index of characteristic evaluation of the color filter. Details are uncertain as to the fact that a diffuse reflectance of the organic pigment microparticles and a luminance of a color filter of a coating film prepared using a dispersion of the organic pigment microparticles are related to each other. The inventors of the present invention consider that a diffuse reflection by a pigment itself in a specific color is a factor controlling a luminance that is an index indicating a brightness as a color filter, in addition to transmission of only a specific color by an organic pigment composition contained in the coating film, when a backlight passes through the color filter, for example, in a color filter used for a liquid crystal display device. However, the case of showing a diffuse reflection of a light other than a light of a target wavelength, that is, a diffuse reflection of a light other than a light of a target color, is not preferable, because the case causes perception of other colors mixed in the color filter. For example, when aiming for a red color, the case of showing a diffuse reflection of a light of a wavelength other than the target wavelengths of 620 to 750 nm, makes coloration by a light other than a red light be also perceived, and causes a change in color or the like, and as a result, lowers a luminance. The inventors of the present invention consider that in the present invention, a luminance can be controlled by controlling a proportion occupied by a diffuse reflectance in a wavelength range of the target color in a diffuse reflectance in the entire measurement wavelength range of the powders of the organic pigment microparticles, that is, by controlling a ratio of an area of a diffuse reflectance in the target wavelength range to an total area of a diffuse reflectance in the entire measurement wavelength range (wavelengths of 380 to 780 nm) (a ratio of an area of a diffuse reflectance in the target wavelength range: DiR [%]) of the powders of the organic pigment microparticles.

A method of measuring a diffuse reflectance is not particularly limited as long as a diffuse reflection spectrum of the organic pigment microparticles can be measured. Examples of its measurement apparatus include a UV-visible near infrared spectrophotometer V-750, V-770, V-7080, V-7090 (all, JASCO Corporation), UV-3600, Solid-Spec 3700 (Shimadzu Corporation), and the like. Further, in the present invention, it is preferable to measure a diffuse reflection spectrum of the powder of the organic pigment microparticles, for the purpose of eliminating an influence of a dispersing agent or a dispersion medium contained in an organic pigment composition, and due to a simplest method. The inventors of the present invention found the relation between a diffuse reflectance of the organic pigment microparticles and a luminance of a color filter of a coating film prepared by using the organic pigment microparticle dispersion, and found that high luminance of a color filter can be realized by controlling a diffuse reflectance of the organic pigment, and thus have accomplished the present invention.

At least a part of the surface of the organic pigment microparticles of the present invention may be coated with an oxide. For example, by coating at least a part of the surface of the organic pigment microparticles with an oxide such as silicon oxide, there is an advantage that a diffuse reflectance and a luminance of a color filter can be improved in the present invention. When at least a part of the surface of the organic pigment microparticles is coated with an oxide such as a silicon oxide, the oxide such as silicon oxide preferably contains amorphous oxide from the viewpoint of a diffuse reflectance and a luminance in the color filter characteristics. It is because when at least a part of the surface of the organic pigment microparticles is coated with a crystalline oxide, there is a possibility that a reflectance of a light other than a light of the target wavelength becomes higher due to an influence on a refractive index or the like.

However, a method of controlling a diffuse reflectance of the organic pigment microparticles in the present invention is not particularly limited. A diffuse reflectance in the intended color characteristics of the organic pigment microparticles can be controlled by pH adjustment at the time of mixing the fluid containing the organic pigment solution and the fluid containing the precipitation solvent to precipitate the organic pigment microparticles; control of a diffuse reflectance by surface treatment of the organic pigment microparticles by a method of coating at least a part of the surface of the organic pigment microparticles with an oxide such as a silicon oxide, a macromolecule, a resin or the like; or control of a diffuse reflectance by changing a crystal form, a degree of crystallinity, a particle diameter, a particle size distribution, or the like of the organic pigment microparticles.

The pH adjustment at the time of precipitating the organic pigment microparticles may be adjusted by adding a pH adjusting agent in at least one of various solutions and solvents in the present invention, or may be adjusted by changing the flow rate at the time of mixing the fluid containing the organic pigment solution and the fluid containing the precipitation solvent. When at least a part of the surface of the organic pigment microparticles is coated with an oxide such as silicon oxide, the flow rate at the time of mixing the fluid containing the organic pigment solution and the fluid containing the precipitation solvent, or the flow rate at the time of mixing the mixed fluid of the above two fluids and the fluid containing a treatment substance for producing an oxide from a raw material of the oxide, may be changed for pH adjustment. As the pH adjusting agent, the above mentioned basic substance or acidic substance may be used, or a salt of the basic substance or acidic substance may be used.

In particular, in the case of precipitating the organic pigment microparticles coated with silicon oxide, it is advantageous from the viewpoint of increasing a diffuse reflectance that the pH of the fluid after mixing at the time of precipitation is adjusted to be in the range of 5.0 to 12, preferably 6.5 to 10, more preferably 6.5 to 8. When the pH is less than 5.0, precipitation of silicon oxide becomes difficult, so that coating of the organic pigment microparticles with silicon oxide may be insufficient. When the pH exceeds 12, the precipitated silicon oxide may be redissolved, so that coating of the organic pigment microparticles may be insufficient.

Examples of oxides such as silicon oxide coating at least a part of the surface of the organic pigment microparticles, include silicon oxide, aluminum oxide such as alumina ($Al_2O_3$), zirconium oxide such as zirconia ($ZrO_2$), and organic oxides such as organopolysiloxane. The macromolecule or resin coating at least a part of the surface of the organic pigment microparticles is not particularly limited, but examples thereof include polyethylene glycol, polyvinyl alcohol, polyvinyl pyrrolidone, sodium polyacrylate, cellulose such as hydroxypropyl methyl cellulose and the like, sodium alginate, sodium carboxymethyl cellulose, xanthan gum, carrageenan, pullulan, and a water soluble macromolecule compound such as gelatin and the like.

In the case that the oxide coating at least a part of the surface of the organic pigment microparticles is an inorganic oxide, a coupling agent may be interposed between the surface of the organic pigment microparticles and the oxide. It is preferable to interpose a coupling agent between both for improvement of affinity of both. When silicon oxide is used as an oxide, a silane coupling agent is used as a coupling agent. The silane coupling agent is not particularly limited as long as it has two or more different reactive groups in the molecule. Examples thereof include 3-aminopropyltriethoxysilane, 3-(2-aminoethylamino)propyltrimethoxysilane, 3-(2-aminoethylamino)propyldimethoxymethylsilane, 3-(2-aminoethylamino) propyltriethoxysilane, 3-aminopropyldimethoxymethylsilane, bis[3-(trimethoxysilyl)propyl]amine, 3-aminopropyldiethoxymethylsilane, [3-(N,N-dimethylamino)propyl]trimethoxysilane, 3-aminopropyltrimethoxysilane, trimethoxy[3-(methylamino)propyl] silane, and the like. When aluminum oxide is used as the oxide, acetoalkoxyaluminum diisopropylate, aluminum acetylacetonate and the like may be used as the coupling agent. When zirconium oxide is used as the oxide, zirconium acetylacetonate, zirconium stearate and the like may be used as the coupling agent. Bonding between the coupling agent and the organic pigment microparticles is not limited to those derived from affinity of the lipophilic group, but a direct bond may be formed by reacting the organic pigment microparticles with the coupling agent. The coupling agent and the oxide are bonded by dehydration condensation polymerization by the sol-gel method.

In the case of coating a part of the surface of the organic pigment microparticles with an oxide in a liquid phase method, a raw material of the oxide, a treatment material forming the oxide from a raw material of the oxide, a coupling agent, or the like, may be contained in at least any one of the above mentioned organic pigment solution, precipitation solvent, and another fluid different from the organic pigment solution and precipitation solvent. In the case that the oxide is silicon oxide, a raw material of the oxide includes an inorganic compound such as silicon oxide, silicon hydroxide, silicon chloride and a silicon salt, and a hydrate thereof, and an organic compound such as a silicon alkoxide and silicon acetylacetonate, and a hydrate thereof. Not particularly limited, their examples include phenyltrimethoxysilane, methyltrimethoxysilane, methyltriethoxysilane, 3-glycidoxypropyltrimethoxysilane, 3-trifluoropropyl-trimethoxysilane, methacryloxypropyltriethoxysilane, tetramethoxysilane (TMOS), tetraethoxysilane (TEOS), and an oligomeric condensate of TEOS, for example, ethyl silicate 40, tetraisopropylsilane, tetrapropoxysilane, tetraisobutoxysilane, tetrabutoxysilane, and a similar material thereof. Further as a raw material of silicon oxide, another siloxane compound, bis(triethoxysilyl)methane, 1,9-bis(triethoxysilyl)nonane, diethoxydichlorosilane, triethoxychlorosilane and the like may be used. In the case that the oxide is alumina, a raw material of alumina includes an inorganic compound such as aluminum oxide, aluminum hydroxide, aluminum chloride and an aluminum salt, and a hydrate thereof, and an organic compound such as an aluminum alkoxide and an aluminum acetylacetonate compound, and a hydrate thereof. Not particularly limited, their examples include aluminum compounds such as aluminum hydroxide, aluminum isopropoxide, aluminum butoxide and the like. In the case that the oxide is zirconia, a raw material of zirconia includes an inorganic compound such as zirconium oxide, zirconium hydroxide, zirconium chloride and a zirconium salt, and a hydrate thereof, and an organic compound such as a zirconium alkoxide and zirconium acetylacetonate, and a hydrate thereof. Not particularly limited, their examples include zirconium compounds such as zirconium isopropoxide, zirconium butoxide and the like. A treatment substance for producing an oxide from a raw material of the oxide is preferably a basic substance. Not particularly limited, their examples include a metal hydroxide such as sodium hydroxide and potassium hydroxide, a metal carbonate such as sodium carbonate and potassium carbonate, an amine compound such as triethylamine, 2-diethylaminoethanol and diethylamine and the like, and ammonia, and a quarternary ammonium hydroxide such as tetrabutyl ammonium hydroxide and benzyltrimethyl ammonium hydroxide, and the like. Another fluid different from the organic pigment solution and precipitation solvent may contain aforementioned water, an organic solvent, or a mixed solvent composed of a plurality of them.

In PCT/JP2016/77378, which is an earlier application of the present applicant, an invention related to organic pigment microparticles in which a part of the surface thereof is coated with an oxide, is proposed. However, the organic pigment microparticles do not matter whether or not an oxide coating exists, as described above. In other words, the present invention can be performed using only the organic pigment microparticles according to the invention of the earlier application, or the present invention can be performed in combination with other organic pigment microparticles, or the present invention can also be performed using only other pigment microparticles. A crystal structure of an oxide coating of the organic pigment microparticles according to the invention of the earlier application is not particularly limited. The present invention can be performed using oxide coatings having various crystallinity, for example, oxide coatings having high crystallinity, amorphous oxide coatings, or a mixture thereof. The present invention was accomplished on the basis of a new finding of the relation between a diffuse reflectance of the organic pigment microparticles and a luminance of the color filter obtained from the organic pigment microparticles. The new finding of this relation can be applied, irrespective of a structure of the organic pigment microparticles themselves.

When at least a part of the surface of the organic pigment microparticles is coated with an oxide such as silicon oxide, the oxide coated organic pigment microparticles may be used as long as they have controlled diffuse reflectance. The organic pigment microparticles in which at least a part of surface of not an aggregate of a plurality of the organic pigment microparticles, but one organic pigment microparticle, is coated with an oxide such as silicon oxide, are preferable. However, the organic pigment microparticles in which at least a part of surface of an aggregate of a plurality of the organic pigment microparticles is coated with an oxide such as silicon oxide, may be used.

In that case that the coated organic pigment microparticles are the organic pigment microparticles in which at least a part of the surface of one organic pigment microparticle is coated with an oxide such as silicon oxide, it is preferable that the particle diameter of the oxide coated organic pigment microparticles is 100.5% or more and 190% or less relative to the primary particle diameter of the organic pigment microparticles. When oxide coating is too thin relative to the organic pigment microparticles, the effect regarding control of a diffuse reflection of the oxide coated organic pigment microparticles may not exhibit. Thus, it is preferable that the particle diameter of the oxide coated organic pigment microparticles is not less than 100.5% relative to the particle diameter of the organic pigment microparticles before coating. It is preferable that the particle diameter of the oxide coated organic pigment microparticles is not more than 190% relative to the particle diameter of the organic pigment microparticles before coating, because the effect regarding control of a diffuse reflection of the oxide coated organic pigment microparticles may not exhibit.

The organic pigment microparticles in which at least a part of the surface of an aggregate exceeding a certain size is coated with an oxide such as silicon oxide is not preferable, because it is difficult to obtain the effect regarding control of a diffuse reflection, compared with the organic pigment microparticles in which at least a part of the surface of one organic pigment microparticle is coated with an oxide such as silicon oxide. The particle diameter of the coated organic pigment microparticles in which at least a part of the surface of the aggregate is coated with an oxide such as silicon oxide, is preferably not more than 190% of the particle diameter of the aggregate. Here, the aggregate exceeding a certain size refers to those which diameter is, for example, more than 500 nm. When a coating of an oxide such as silicon oxide is too thin relative to the organic pigment microparticles, the effect regarding control of a diffuse reflection of the oxide coated organic pigment microparticles may not exhibit. Thus, it is preferable that the particle diameter of the oxide coated organic pigment microparticles is not less than 100.5% relative to the particle diameter of the aggregates. Here, a diameter of the aggregate refers to a maximum distance between two points on the outer periphery of the aggregate of a plurality of the organic pigment microparticles.

Regarding coating of the organic pigment microparticles, when an oxide coating at least a part of the surface of the organic pigment microparticles is silicon oxide, an infrared absorption spectrum (FT-IR) measurement and an X-ray diffraction (XRD) measurement were performed for the silicon oxide coated organic pigment microparticles. It was confirmed that the oxide was amorphous by confirmation of a peak derived from silicon oxide in the FT-IR measurement and no confirmation of a peak derived from silicon oxide in the XRD measurement. In addition, a scanning transmission electron microscope (hereinafter referred to as STEM) observation was performed for the silicon oxide coated organic pigment microparticles. It was confirmed that the oxide was amorphous by no confirmation of a crystal lattice derived from silicon oxide.

A state of coating of the organic pigment microparticles can be confirmed by an electron microscope such as a transmission electron microscope (hereinafter referred to as TEM), STEM and the like.

In the present invention, the organic pigment microparticles having controlled diffuse reflectance can be produced by using a forced thin film type microreactor disclosed as the fluid processing apparatus in Patent Literature 1, but it is not limited thereto. For example, the method includes a method of preparing the organic pigment microparticles by using another type of microreactor; a method of preparing the organic pigment microparticles by a reaction in a batch container under a dilute system, or the like; a method of preparing the organic pigment microparticles by pulverizing an organic pigment by a pulverization method such as a bead mill, and the like. A method of coating at least a part of the surface of the organic pigment microparticles with an oxide such as silicon oxide includes, for example, a method of preparing the organic pigment microparticles in the first microreactor, followed by coating at least a part of the surface of the organic pigment microparticles with an oxide such as silicon oxide in the second microreactor; a method of preparing the organic pigment microparticles in a batch vessel under a dilute system and the like, followed by coating at least a part of the surface of the organic pigment microparticles with an oxide such as silicon oxide under a dilute system, and the like; a method of preparing the organic pigment microparticles by a pulverization method such as bead mill, followed by coating at least a part of the surface of the organic pigment microparticles with an oxide such as silicon oxide in a reaction vessel, and the like. The apparatus and method as proposed by the present applicant and described in JP 2009-112892 may be also used. Of course, a method of producing the organic pigment microparticles using a forced thin film type microreactor described above may be used. In the present invention, the above organic pigment microparticles prepared by using a poor solvent method or the like, and the above organic pigment microparticles in which at least a part of the surface of the organic pigment microparticles is coated with silicon oxide, are less likely to cause distortion or the like in crystallinity of the microparticles, compared with the organic pigment microparticles prepared by pulverization using a bead mill or the like. Therefore, the organic pigment microparticles are suitable for improving a diffuse reflectance and a luminance of a color filter.

A coloring composition which may comprise the organic pigment composition of the present invention is one used for a color filter, and contains at least the organic pigment composition, a photosensitive monomer, and a photopolymerization initiator. In addition, the coloring composition may include a binder resin and an alkali soluble resin.

Examples of the photosensitive monomer include a monofunctional monomer such as nonylphenyl carbitol acrylate, 2-hydroxy-3-phenoxypropyl acrylate, 2-ethylhexyl carbitol and the like, and (meth)acrylic acid ester having two or more ethylenic unsaturated double bonds (for example, a compound obtained by esterifying a plurality of hydroxyl groups of a polyhydric alcohol with acrylic acid, etc.), and a polyfunctional monomer such as urethane (meth)acrylate, (meth)acrylic acid amide, allyl compound, vinyl ester and the like. Examples of the photopolymerization agent include aromatic ketones, lophine dimer, benzoin, benzoin ethers, polyhalogen and the like. Examples of the photopolymerization initiator include a combination of 4,4'-bis(diethylamino)benzophenone and 2-(o-chlorophenyl)-4,5-diphenylimidazole dimer, 4-[p-N,N-di(ethoxycarbonylmethyl)-2,6-di(trichloromethyl)-s-triazine], 2-methyl-4'-(methylthio)-2-morpholinopropiophenone and the like. These can be used alone or in combination of two or more.

Examples of the binder resin include an acrylic resin, butyral resin, styrene-maleic acid copolymer, chlorinated polyethylene, chlorinated polypropylene, polyvinyl chloride, vinyl chloride-vinyl acetate copolymer, polyvinyl acetate, polyurethane resin, polyester resin, vinyl resin, alkyd resin, polystyrene resin, polyamide resin, rubber resin, cyclized rubber resin, cellulose, polyethylene (HDPE, LDPE), polybutadiene, polyimide resin and the like. Examples of the alkali soluble resin is preferably a copolymer of (meth)acrylic acid ester and (meth)acrylic acid, from the viewpoint of maintenance of dispersion of the pigment in the cured film and improvement of the contrast ratio, and preferable examples thereof include a copolymer of benzyl (meth)acrylate and (meth) acrylic acid.

The coloring composition may further contain an additive such as a sensitizer, an antioxidant, an ultraviolet absorber, a leveling agent, a dispersing agent and the like.

The coating film prepared using the organic pigment composition also includes a coating film prepared using a coloring composition. The coating film can be obtained by coating the coloring composition on a substrate for a color filter by a conventional method, followed by photocuring and developing, but can also be obtained by coating the organic pigment composition on the substrate. The coating film may be baked such as pre-baked and post-baked. A color filter can be prepared by coating the coloring composition on a substrate, followed by photocuring and developing to obtain a coating film.

A method of measuring a luminance of the obtained coating film is not particularly limited. A measuring apparatus such as a spectrophotometer, a spectrophotometer and the like, can be used. An example of the measuring apparatus includes a spectrophotometric meter (product name: CM-3700d, Konica Minolta Inc.) and the like.

In this manner, a luminance of the coating film can be controlled, and also a luminance of the color filter can be controlled, by preparing a coating film using the organic pigment composition containing the organic pigment microparticles whose diffuse reflectance is controlled. Particularly, the color filter produced using the organic pigment microparticles of the present invention, has both higher diffuse reflectance and higher luminance than a color filter produced using bead milled organic pigment microparticles. Here, the bead milled organic pigment microparticles refer to organic pigment microparticles obtained by pulverizing and micronizing an organic pigment used as a raw material in preparing organic pigment microparticles for a color filter by a bead mill.

The method of evaluating a luminance of a coating film prepared using the organic pigment microparticle dispersion of the present invention, is a method wherein a diffuse reflectance of the powders of the organic pigment microparticles is measured, and the luminance of the coating film is evaluated by using the following relation obtained by the following steps (I) to (IV):

Step (I) of obtaining at least one kind of organic pigment microparticles;

Step (II) of measuring the diffuse reflectance of the powders of the organic pigment microparticles in the wavelength range of 380 to 780 nm;

Step (III) of dispersing the organic pigment microparticles in a solvent to obtain the organic pigment microparticle dispersion; and Step (IV) of measuring a luminance of the coating film prepared using the organic pigment microparticle dispersion, to obtain the relation between the luminance of the coating film and a ratio of an area of the diffuse reflectance in the target wavelength range to a total area of the diffuse reflection in the entire measurement wavelength range.

The details of steps (I) to (III) are explained above. Step (IV) is for obtaining the relation between the luminance of the coating film and a ratio of an area of the diffuse reflectance in the target wavelength range (DiR [%]), by plotting and approximating the measured luminance of the coating film, to a ratio of an area of the diffuse reflectance in the target wavelength range to a total area the diffuse reflection in the entire measurement wavelength range (a ratio of an area of a diffuse reflectance in the target wavelength range: DiR [%]), which is calculated from the diffuse reflectance of the powders of the organic pigment microparticles measured in step (II). The present invention enables evaluation of a luminance of a coating film prepared using the organic pigment composition by measuring a diffuse reflectance of the powders of the organic pigment microparticles. Here, the target wavelength range is 620 to 750 nm when the organic pigment microparticles are red pigment microparticles, is 450 to 495 nm when the organic pigment microparticles are blue pigment microparticles, and is 495 to 570 nm when the organic pigment microparticles are green pigment microparticles.

A luminance of a coating film to be evaluated may be a relative value as compared to 100 for a luminance of a standard coating film.

EXAMPLE

Hereinafter, the present invention is explained in more detail with reference to Examples, but the present invention is not limited only to these examples.

Example 1 to 6

An organic pigment solution in which an organic pigment was dissolved in a good solvent was prepared using the high-speed rotary dispersion emulsification apparatus CLEAMIX (product name: CLM-2.2 S, M. Technique Co., Ltd.). Specifically, based on the formulations of the organic pigment solution shown in Table 1, the components of the organic pigment solution were weighed and mixed homogeneously by stirring using CLEARMIX at preparation temperature of 45° C. and at the rotor rotational speed of 20,000 rpm for 30 min to prepare the organic pigment solution. Based on the formulations of the poor solvent shown in Table 1, the components of the poor solvent for precipitating the organic pigment microparticles from the organic pigment solution were weighed and mixed homogeneously by stirring using CLEARMIX at preparation temperature of 35° C. and at the rotor rotational speed of 15,000 rpm for 30 min to prepare the poor solvent. Regarding the chemical substances (including the substances represented by the chemical formula or abbreviations) set forth in Table 1, PR 254 is Irgazin L 3670 HD (BASF Japan Ltd.), MeOH is methanol (Godo Co., Ltd.), DMSO is dimethyl sulfoxide (Kanto Chemical Co., Inc., purity 99.5%), NaOMe is sodium methoxide (Kanto Chemical Co., Inc.), acetic acid is acetic acid (purity>99.7/o, Kanto Chemical Co., Inc.). Pure water having a pH of 5.89 (29.3° C.) and conductivity of 0.79 µS/cm was used.

Next, the prepared organic pigment solution and the poor solvent were mixed using the fluid processing apparatus described in Patent Literature 1 file by the present applicant. Here, the fluid processing apparatus described in Patent Literature 1 is the fluid processing apparatus shown in FIG. 1 in Patent Literature 1, wherein the opening d20 of the second introduction part has concentric annular shapes which are surrounding the central opening of the processing surface 2 which is a ring-shaped disc. Specifically, the poor solvent as liquid A was introduced from the first introduction part d1 into the space between the processing surfaces 1 and 2, and while driving the processing member 10, the organic pigment solution as liquid B was introduced from the second introduction part d2 into the space between the processing surfaces 1 and 2, and the organic pigment solution and the poor solvent were mixed in the thin film fluid, to let the PR 254 microparticles be precipitated in the space between the processing surfaces 1 and 2. A fluid containing the PR 254 microparticles precipitated in the space between the processing surfaces 1 and 2 (hereinafter referred to as PR 254 microparticle dispersion) was discharged from the space between the processing surfaces 1 and 2 of the fluid processing apparatus, and the discharged PR 254 microparticle dispersion was collected in a vessel. Table 2 shows the operating conditions of the fluid processing apparatus. The rotation speed shown in Table 2 is the rotation speed of the processing member 10. The introduction temperatures (liquid sending temperatures) and the introduction pressures (liquid sending pressures) of liquid A and liquid B shown in Table 2 were measured using a thermometer and a pressure gauge provided in a sealed inlet path leading to the space between the processing surfaces 1 and 2 (the first introduction part d1 and the second introduction part d2). The introduction temperature of liquid A shown in Table 2 is the actual temperature of liquid A under the introduction pressure in the first introduction part d1. Similarly, the introduction temperature of liquid B shown in Table 2 is the actual temperature of liquid B under the introduction pressure in the second introduction part d2. The pH of the discharged liquid is shown in Table 2 together with the pH measurement temperature (temperature [° C.]). For the pH measuring the discharged liquid, the pH meter, model number D-51 manufactured by HORIBA Ltd. was used. Since it is difficult to measure the pH of the mixed fluid immediately after mixing the organic pigment solution and the poor solvent, the PR 254 microparticle dispersion was discharged from the apparatus, and collected in a vessel, and the pH of the dispersion was measured at room temperature.

TABLE 1

| | Liquid A: Poor solvent | | | | | | Liquid B: Organic pigment solution | | | | | | | |
| --- | --- | --- | --- | --- | --- | --- | --- | --- | --- | --- | --- | --- | --- | --- |
| | Substance 1 | | Substance 2 | | Substance 3 | | Substance 1 | | Substance 2 | | Substance 3 | | Substance 4 | |
| Example | Kind | [wt %] | Kind | [wt %] | Kind | [wt %] | Kind | [wt %] | Kind | [wt %] | Kind | [wt %] | Kind | [wt %] |
| 1 | Pure water | 60 | MeOH | 20 | Acetic acid | 20 | PR254 | 3.0 | DMSO | 76.0 | MeOH | 19.5 | NaOMe | 1.5 |
| 2 | Pure water | 60 | MeOH | 20 | Acetic acid | 20 | PR254 | 3.0 | DMSO | 76.0 | MeOH | 19.5 | NaOMe | 1.5 |
| 3 | Pure water | 60 | MeOH | 20 | Acetic acid | 20 | PR254 | 3.0 | DMSO | 76.0 | MeOH | 19.5 | NaOMe | 1.5 |
| 4 | Pure water | 70 | MeOH | 10 | Acetic acid | 20 | PR254 | 3.0 | DMSO | 75.6 | MeOH | 19.4 | NaOMe | 2.0 |
| 5 | Pure water | 70 | MeOH | 10 | Acetic acid | 20 | PR254 | 3.0 | DMSO | 75.6 | MeOH | 19.4 | NaOMe | 2.0 |
| 6 | Pure water | 70 | MeOH | 10 | Acetic acid | 20 | PR254 | 3.0 | DMSO | 75.6 | MeOH | 19.4 | NaOMe | 2.0 |

TABLE 2

| Example | Rotation number [rpm] | Introduction flow rate [ml/min] | | Introduction temperature (liquid sending temperature) [° C.] | | Introduction pressure (liquid sending pressure) [MPaG] | | Discharged liquid | | Particle diameter (D) [nm] | DiR [%] | Luminance [—] |
|---|---|---|---|---|---|---|---|---|---|---|---|---|
| | | Liquid A | Liquid B | Liquid A | Liquid B | Liquid A | Liquid B | pH | Temperature [° C.] | | | |
| 1 | 1,000 | 500 | 35 | 2 | 35 | 0.112 | 0.1 | 2.89 | 26.4 | 16.3 | 75.94 | 128.00 |
| 2 | 2,500 | 500 | 35 | 2 | 35 | 0.109 | 0.1 | 2.88 | 26.3 | 15.4 | 75.27 | 127.80 |
| 3 | 3,600 | 500 | 35 | 2 | 35 | 0.113 | 0.1 | 2.87 | 26.1 | 16.1 | 74.94 | 127.33 |
| 4 | 1,700 | 500 | 35 | 2 | 40 | 0.114 | 0.1 | 3.04 | 26.2 | 16.9 | 74.09 | 124.30 |
| 5 | 2,500 | 500 | 35 | 2 | 40 | 0.114 | 0.1 | 3.04 | 26.2 | 15.8 | 71.34 | 108.40 |
| 6 | 3,600 | 500 | 35 | 2 | 40 | 0.114 | 0.1 | 3.04 | 26.2 | 15.4 | 72.27 | 110.64 |
| 7 | — | — | — | — | — | — | — | — | — | 17.4 | 70.01 | 100 (standard) |

Dry powders and wet cake samples were produced from the PR 254 microparticle dispersion which was discharged from the fluid processing apparatus, and collected in a vessel. The manufacturing method was conducted according to a conventional method of this type of processing. The PR 254 microparticles in the PR 254 microparticle dispersion were precipitated, and the supernatant was removed. Thereafter, the PR 254 microparticles were washed and settled five times repetitively with 100 parts by weight of pure water. A part of the finally obtained wet cake of the PR 254 microparticles was dried at 25° C. for 19 hours to obtain the dry powders. The rest was the wet cake sample.

Example 7

As Example 7, PR 254 microparticles were prepared by pulverizing the PR 254 raw material (Irgazine Red L 3670 HD (BASF Co., Ltd.)) for preparing the PR 254 microparticles up to a particle diameter similar to those in Examples 1 to 6, using a bead mill in the same manner as in Examples 1 to 6.

A part of the wet cake sample of the PR 254 microparticles after the washing treatment obtained in Examples 1 to 6, was dispersed in a 0.05 wt % aqueous solution of Neogen RK (Dai-ichi Kogyo Seiyaku Co., Ltd.) as a surfactant. The resulting dispersion was dropped to a collodion membrane, and dried to prepare a TEM (transmission electron microscope) observation sample. A primary particle diameter of the PR 254 microparticles was measured by TEM observation using a transmission electron microscope, JEM-2100 (JEOL Ltd.). The observation condition was the acceleration voltage of 80 kV, and the observation magnification of 10,000 times or more. The particle diameters (D) described in Table 2, were the primary particle diameters, and were calculated from the maximum distance between two points on the outer periphery of the microparticles (the maximum distance between two points on the outer periphery of the microparticles including coating layer, in case of the following examples in which at least a part of the surface of the organic pigment microparticles is coated with an oxide), and the average value of the measured particle diameters of 100 particles was shown. Also, the PR 254 microparticles obtained in Example 7 were dispersed in a 0.05 wt % aqueous solution of Neogen RK (Dai-ichi Kogyo Seiyaku Co., Ltd.) as a surfactant. The resulting dispersion was dropped to a collodion membrane, and dried to prepare a TEM (transmission electron microscope) observation sample. A primary particle diameter of the PR 254 microparticles was measured by TEM observation in the same manner as in Examples 1 to 6, and the particle diameter (D) was calculated.

(Diffuse Reflectance Spectrum)

The ultraviolet-visible near-infrared spectrophotometer (product name: SolidSpec-3700, Shimadzu Corporation) was used for a diffuse reflection spectrum. Measurement range was 380 to 780 nm, and the sampling rate was 2.0 nm, and the measurement speed was medium speed, and measurement method was a double beam photometry, and a diffuse reflection measurement except specular reflection was performed. For a background measurement (baseline) in measuring powders, the standard white plate (product name: Spectralon™, Labsphere Inc.) was used. A diffuse reflection spectrum was measured using dry powders of the organic pigment microparticles obtained in each Example.

(Preparation of Sample for Luminance Measurement)

For measurement of a luminance as a color filter, the organic pigment microparticle dispersions and cured films were prepared using the PR 254 microparticles obtained in Examples 1 to 7. Specifically, 20 parts by weight of the dry powders of the PR 254 microparticles obtained in Examples 1 to 7, 25.92 parts by weight of "BYK-LNP-6919" (solid content concentration 60.9% by weight, BYK Chemie Japan) as a resin type dispersing agent, 33.75 parts by weight of a vinyl ester resin "LIPOXY SPC-2000" (solid content concentration: 35% by weight, Showa Denko K.K.) as a resin type dispersing agent, and 110.53 parts by weight of propylene glycol monomethyl ether acetate (hereinafter "PGMEA") were dispersed with 20,000 rpm of a rotor and 18,000 rpm of a screen by CLEAMIX DOUBLE MOTION (CLM-2.2/3.7W, M Technique Co., Ltd.) for 1 hour, to obtain the organic pigment microparticle dispersions. The obtained organic pigment microparticle dispersion was applied on a glass substrate with a spin coater, and then heated and dried (pre-baked) at 90° C. for 2 minutes 30 seconds in a dryer to obtain a coating film. Further, the obtained coating film was heated and dried (post-baked) at 230° C. for 30 minutes in a drier and cooled to obtain a colored glass plate (a color filter).

Luminances of the obtained colored glass substrates of Examples 1 to 7 were measured as follows. The colored glass substrates were set on a spectrocolorimeter (product name: CM-3700d, Konica Minolta, Inc.), and the chromaticity of transmission on the XYZ coordinate axes at C illuminant 2° was measured. The Y value in the measurement was adopted as a luminance.

FIG. 1 shows a diffuse reflection spectrum measured in the wavelengths of 380 to 780 nm using the powders of the PR 254 microparticles obtained in Examples 1, 2, 3 and 7. Based on the measurement results shown in FIG. 1, a ratio of an area of a diffuse reflectance in the wavelengths of 620 to 750 nm to the total area of a diffuse reflectance in the entire measurement wavelength (a ratio of an area of a diffuse reflectance in the target wavelength range: DiR [%]) was calculated, and shown in Table 2 together with the luminance of the colored glass substrate. Luminances of the colored glass plates of Examples 1 to 7 in Table 2 are shown as relative values as compared to a luminance of the colored glass plate of Example 7 as a standard (100). The PR 254 microparticles obtained in Examples 4 to 6 were also subjected to the same measurement.

Examples 8 to 10

Examples 8 to 10 are examples in which at least a part of the surface of the PR 254 microparticles was coated with silicon oxide by using the fluid processing apparatus described in Patent Literature 1 by the present applicant.

The first fluid (also referred to as liquid A) and the second fluid (also referred to as liquid B) were prepared using CLEAMIX (product name: CLM-0.8S, M Technique Co., Ltd.). Specifically, based on the formulations of liquid A shown in Table 3, the components of liquid A were weighed and mixed homogeneously by stirring using CLEARMIX at the preparation temperature of 25° C. and at the rotor rotational speed of 10,000 rpm for 30 min to prepare liquid A. Based on the formulations of liquid B shown in Table 3, the components of liquid B were weighed and mixed homogeneously by stirring using CLEARMIX at the preparation temperature of 40° C. and at the rotor rotational speed of 20,000 rpm for 30 min to prepare liquid B. The third fluid (also referred to as liquid C) shown in Table 3 was used as it was without additional processing. In Examples 8 to 10, the first fluid is a poor solvent for precipitating the organic pigment, the second fluid is the organic pigment solution in which the organic pigment is dissolved in a good solvent, and the third fluid is a fluid containing a treatment substance to be generated an oxide from a raw material of the oxide.

Regarding the chemical substances (including the substances represented by the chemical formula or abbreviations) set forth in Table 3, acetic acid is acetic acid (purity>99.7%, Kanto Chemical Co., Inc.), TEOS is tetraethyl orthosilicate (Wako Pure Chemical Industries, Ltd.), PR 254 is Irgazin L 3670 HD (BASF Japan Ltd.), 3-aminopropyldiethoxymethylsilane is 3-aminopropyldiethoxymethylsilane (purity>97.0%, Tokyo Chemical Industry Co., Ltd.), 40% BTMA methanol solution is benzyltrimethylammonium hydroxide, 40% methanol solution (Tokyo Chemical Industry Co., Ltd.), DMSO is dimethyl sulfoxide (Kishida Chemical Co., Ltd.), and 28% ammonia water was ammonia (Kishida Chemical Co., Ltd.). Pure water having a pH of 5.89 (29.3° C.) and conductivity of 0.79 μS/cm was used.

TABLE 3

|  |  |  | Raw material | wt % |
|---|---|---|---|---|
| Examples 8 to 10 | 1st fluid | Liquid A | Acetic acid | 20.0 |
|  |  |  | TEOS | 0.3 |
|  |  |  | Pure water | 79.7 |
|  | 2nd fluid | Liquid B | PR254 | 9.0 |
|  |  |  | 3-aminopropyldiethoxy-methylsilane | 0.9 |

TABLE 3-continued

|  |  |  | Raw material | wt % |
|---|---|---|---|---|
|  |  |  | 40% BTMA methanol solution | 32.0 |
|  |  |  | DMSO | 58.1 |
|  | 3rd fluid | Liquid C | 28% aqeous ammonia | 100.0 |

Then, the prepared first fluid and the second fluid, and the third fluid were mixed using the fluid processing apparatus described in Patent Literature 1. Here, the fluid processing apparatus described in Patent Literature 1 is a fluid processing apparatus described in FIG. 1 of Patent Literature 1, wherein the third introduction part is equipped in addition to the first introduction part d1 and the second introduction part d2 (paragraph [0082] of Patent Literature 1), and the opening d20 of the second introduction part d2 is provided on the upstream side of the opening d30 of the third introduction portion d3, and the openings d20 and d30 of the second and third introduction parts have concentric annular shapes which are surrounding the central opening of the processing surface 2 which is a ring-shaped disc. Specifically, liquid A as the first fluid was introduced from the first introduction part d1 into the space between the processing surfaces 1 and 2, and while driving the processing member 10 at a rotational speed of 1,130 rpm, liquid B as the second fluid was introduced from the second introduction part d2 into the space between the processing surfaces 1 and 2, and liquid A and liquid B were mixed in the thin film fluid, to let PR 254 microparticles be precipitated in the space between the processing surfaces 1 and 2. Then, liquid C as the third fluid was introduced from the third introduction part d3 into the space between the processing surfaces 1 and 2, and liquid C was mixed with the fluid containing the PR 254 microparticles previously precipitated in the thin film fluid. In the thin film fluid, silicon oxide was precipitated on the surface of the PR 254 microparticles previously precipitated, and the fluid containing the silicon oxide coated PR 254 microparticles (hereinafter, the silicon oxide coated PR 254 microparticle dispersion) was discharged from the space between the processing surfaces 1 and 2 of the fluid processing apparatus, and was collected in a vessel. Table 4 shows the operating conditions of the fluid processing apparatus. The introduction pressures and the introduction temperatures of the first fluid to the third fluid and the pH of the discharged liquid were measured in the same manner as in Examples 1 to 6. Since it is difficult to measure the pH of the mixed fluid immediately after mixing the fluid containing the PR 254 microparticles and the fluid containing a treatment substance for producing the oxide from the raw material of the oxide as the third fluid, the silicon oxide coated PR 254 microparticle dispersion was discharged from the apparatus, and collected in a vessel, and the pH of the dispersion was measured at room temperature.

Figure 7:
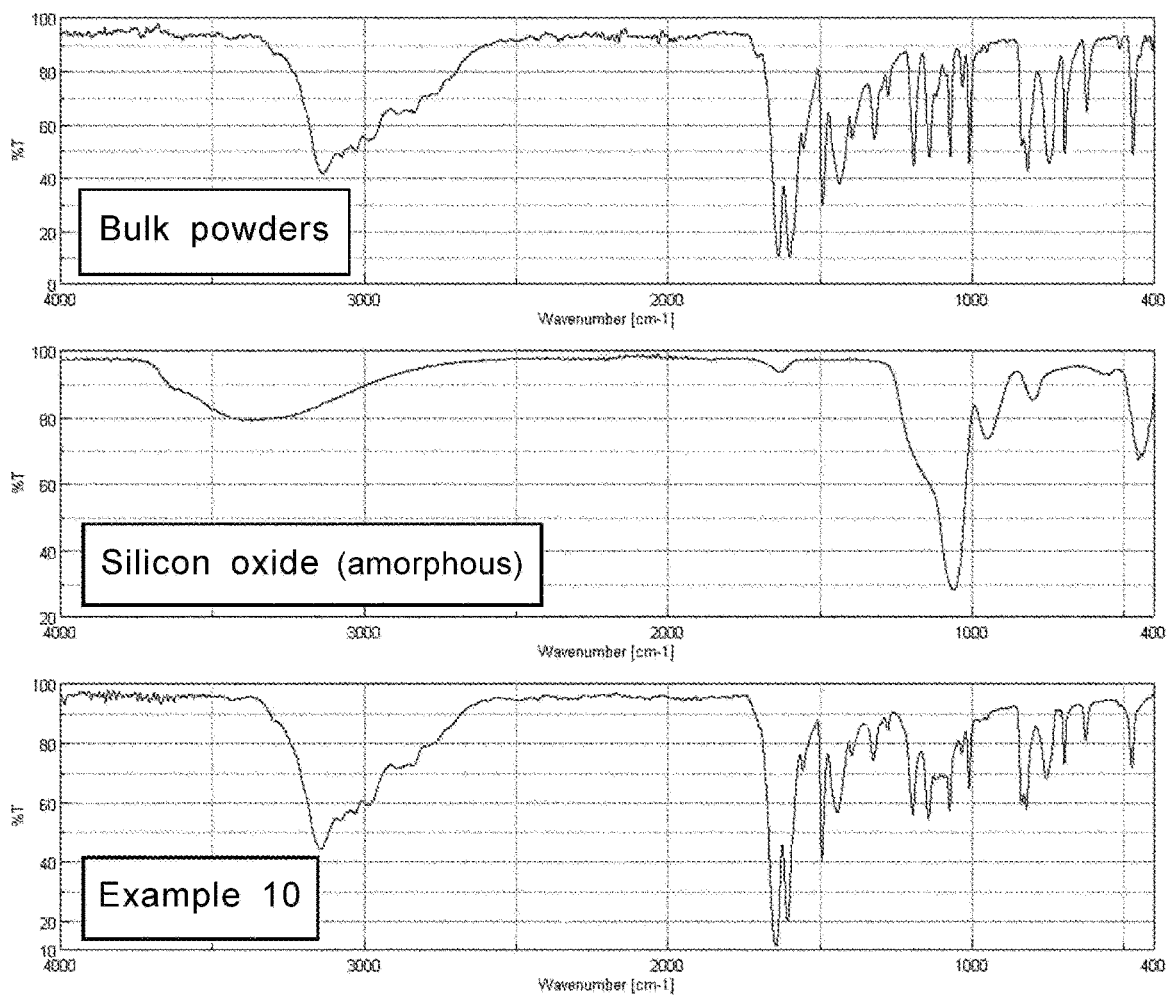
FIG. 7 shows an IR measurement result of the silicon oxide coated PR 254 microparticles obtained in Example 10 of the present invention.

The FT-IR measurement, the XRD measurement, and the STEM observation of the silicon oxide coated PR 254 microparticles prepared in Examples 8 to 10 were performed. In the FT-IR measurement, a peak derived from silicon oxide was observed in the vicinity of 1,100 cm$^{-1}$, but in the XRD measurement, peaks derived from silicon oxide could not be confirmed. FIG. 7 shows an IR measurement result of the silicon oxide coated PR 254 microparticles obtained in Example 10, together with IR measurement results of amorphous silicon oxide (silicon dioxide (by precipitation, amorphous), 3N, purity 99.9%, Kanto Chemical Co., Inc.), and of PR 254 (Irgazine Red L 3670 HD, BASF Japan Ltd.) used as a raw material (indicated as "bulk powders" in FIG. 7). In STEM observation, no crystal lattice derived from silicon oxide was confirmed. From the above results, it was confirmed that the silicon oxide of the silicon oxide coated PR 254 microparticles was amorphous. For the IR measurement, Fourier transform infrared spectrophotometer FT/IR-4100 (JASCO Corporation) was used, and the measurement conditions were ATR method, resolution of 4.0 cm$^{-1}$, and number of integration times of 1,024 respectively. For the X-ray diffraction (XRD) measurement, powder X-ray diffraction measurement apparatus EMPYREAN (PANalytical Division, Spectris Co., Ltd.) was used, and the measurement conditions were a measurement range: 10 to 100 [° 2 Theta], Cu versus a cathode, a tube voltage of 45 kV, a tube current of 40 mA, and a scanning speed of 0.3°/min.

With respect to the silicon oxide coated PR 254 microparticles prepared in Examples 8 to 10, mapping and quantification of elements using STEM were performed to confirm a state of coating of silicon oxide on the PR 254 microparticles. For the mapping and quantification of elements contained in the silicon oxide coated PR 254 microparticles by STEM observation and STEM-EDS analysis, the atomic resolution analytical electron microscopy JEM-ARM200F (JEOL Ltd.) equipped with the energy dispersive X-ray analyzer Centurio (JEOL Ltd.) was used, and a beam diameter of 0.2 nm was used for analysis.

Regarding one particle observed in the dark field image (HADDF image), distribution of silicons (Si) and oxygens (O) was observed in the entire particle, and distribution of nitrogen (N) derived from PR 254 was observed in an area narrower than the area where silicons (Si) and oxygens (O) were observed. From this observation, it is considered that the silicon oxide coated PR 254 microparticles obtained in Examples 8 to 10 are in a state where the entire surface of the PR 254 microparticles is coated with silicon oxide.

Washing of the silicon oxide coated PR 254 microparticles, measurement of a primary particle diameter of the silicon oxide coated PR 254 microparticles and calculation of the particle diameter (D), measurement of a diffuse reflectance of the silicon oxide coated PR 254 microparticles and calculation of a ratio of an area of a diffuse reflectance in the target wavelength range (DiR [%]), preparation of the organic pigment microparticle dispersion, preparation of a coating film, and measurement and evaluation of a luminance of a colored glass substrate, were performed in the same manner as in Examples 1 to 6 or 7. The results are shown in Table 4.

Examples F-1, F-2

In Example F-1, the PR 254 microparticles were prepared in the same manner as in Example 1 except for using an apparatus described in JP 2009-112892, and using a method of mixing and reacting liquid A and liquid B. Here, the apparatus of JP 2009-112892 is an apparatus described in FIG. 1 of JP 2009-112892, wherein the inner diameter of the stirring tank is 420 mm, and the gap between the outer end of the mixing tool and the inner peripheral surface of the stirring tank is 1 mm, and the rotor rotational speed of the stirring blade was the same as the rotor rotational speed (1,130 rpm) of the processing member 10 in the fluid processing apparatus used in Example 1. Further, liquid A was introduced into the stirring tank, and liquid B was added, mixed and reacted in the thin film consisting of liquid A that was crimped to the inner peripheral surface of the stirring tank. Table 5 shows the operating conditions of the apparatus.

In Example F-2, the silicon oxide coated PR 254 microparticles were prepared in the same manner as in Example 8 except for using an apparatus described in JP 2009-112892, and using a method of mixing and reacting liquid A, liquid B and liquid C. Here, the apparatus of JP 2009-112892 is an apparatus described in FIG. 4 of JP 2009-112892, wherein the inner diameter of the stirring tank is uniform and is 420 mm, and the gap between the outer end of the mixing tool and the inner peripheral surface of the stirring tank is 1 mm, and the rotor rotational speed of the stirring blade was the same as the rotor rotational speed (1,130 rpm) of the processing member 10 in the fluid processing apparatus used in Example 8. Further, liquid A was introduced into the stirring tank, and liquid B was added, mixed and reacted in the thin film consisting of liquid A that was crimped to the inner peripheral surface of the stirring tank. Then, liquid C was added, mixed and reacted in the thin film consisting of the mixed liquid of liquid A and liquid B crimped to the inner peripheral surface of the stirring tank. Table 6 shows the operating conditions of the apparatus.

Washing of the silicon oxide coated PR 254 microparticles, measurement of a primary particle diameter of the silicon oxide coated PR 254 microparticles and calculation of the particle diameter (D), measurement of a diffuse reflectance of the silicon oxide coated PR 254 microparticles and calculation of a ratio of an area of a diffuse reflectance in the target wavelength range (DiR [%]), preparation of the organic pigment microparticle dispersion, preparation of a

TABLE 4

| Example | Introduction flow rate [ml/min] | | | Introduction temperature (liquid sending temperature) [° C.] | | | Introduction pressure (liquid sending pressure) [MPaG] | | | pH | Discharged liquid Temperature [° C.] | Particle diameter (D) [nm] | DiR [%] | Luminance [—] |
|---|---|---|---|---|---|---|---|---|---|---|---|---|---|---|
| | Liquid A | Liquid B | Liquid C | Liquid A | Liquid B | Liquid C | Liquid A | Liquid B | Liquid C | | | | | |
| 8 | 300 | 30 | 60 | 7 | 50 | 60 | 0.089 | 0.1 | 0.1 | 6.15 | 25.6 | 20.3 | 77.62 | 130.10 |
| 9 | 350 | 30 | 70 | 7 | 50 | 70 | 0.091 | 0.1 | 0.1 | 9.09 | 25.1 | 20.1 | 77.78 | 132.10 |
| 10 | 400 | 30 | 80 | 7 | 50 | 80 | 0.093 | 0.1 | 0.1 | 9.11 | 25.4 | 20.9 | 76.57 | 129.30 |
| 7 | — | — | — | — | — | — | — | — | — | — | — | 17.4 | 70.01 | 100 (standard) | coating film, and measurement and evaluation of a luminance of a colored glass substrate, were performed in the same manner as in Examples 1 to 6 or 7. The results are shown in Tables 5 and 6.

2, when a ratio of an area of a diffuse reflectance in the wavelengths of 620 to 750 nm that is important for a red color filter, to a total area of a diffuse reflectance in the entire measurement wavelength range (a ratio of an area of a

TABLE 5

| Example | Rotation number [rpm] | Introduction flow rate [ml/min] | | Introduction temperature (liquid sending temperature) [° C.] | | Introduction pressure (liquid sending pressure) [MPaG] | | Discharged liquid | | Particle diameter (D) [nm] | DiR [%] | Luminance [—] |
|---|---|---|---|---|---|---|---|---|---|---|---|---|
| | | Liquid A | Liquid B | Liquid A | Liquid B | Liquid A | Liquid B | pH | Temperature [° C.] | | | |
| F-1 | 1,000 | 500 | 35 | 2 | 35 | 0.112 | 0.1 | 2.99 | 26.1 | 25.9 | 71.79 | 110.14 |
| 7 | — | — | — | — | — | — | — | — | — | 17.4 | 70.01 | 100 (standard) |

TABLE 6

| Example | Introduction flow rate [ml/min] | | | Introduction temperature (liquid sending temperature) [° C.] | | | Introduction pressure (liquid sending pressure) [MPaG] | | | Discharged liquid | | Particle diameter (D) [nm] | DiR [%] | Luminance [—] |
|---|---|---|---|---|---|---|---|---|---|---|---|---|---|---|
| | Liquid A | Liquid B | Liquid C | Liquid A | Liquid B | Liquid C | Liquid A | Liquid B | Liquid C | pH | Temperature [° C.] | | | |
| F-2 | 300 | 30 | 60 | 7 | 50 | 60 | 0.089 | 0.1 | 0.1 | 6.16 | 25.4 | 31.2 | 75.59 | 123.56 |
| 7 | — | — | — | — | — | — | — | — | — | — | — | 17.4 | 70.01 | 100 (standard) |

The FT-IR measurement, the XRD measurement, and the STEM observation were performed for the silicon oxide coated PR 254 microparticles produced in Example F-2 in the same manner as in Examples 8 to 10. In the FT-IR measurement, a peak derived from silicon oxide was observed in the vicinity of 1,100 cm$^{-1}$, but in the XRD measurement, peaks derived from silicon oxide could not be confirmed. In STEM observation, no crystal lattice derived from silicon oxide was confirmed. From the above results, it was confirmed that the silicon oxide of the silicon oxide coated PR 254 microparticles was amorphous.

With respect to the silicon oxide coated PR 254 microparticles prepared in Example F-2, mapping and quantification of elements using STEM (scanning transmission electron microscopy) were performed in the same manner as in Examples 8 to 10. Regarding one particle observed in the dark field image (HADDF image), distribution of silicons (Si) and oxygens (O) was observed in the entire particle, and distribution of nitrogen (N) derived from PR 254 was observed in an area narrower than the area where silicons (Si) and oxygens (O) were observed. From this observation, it is considered that the silicon oxide coated PR 254 microparticles obtained in Example F-2 are in a state where a part of the surface of the PR 254 microparticles is coated with silicon oxide.

As in Examples 1 to 7, a ratio of an area of a diffuse reflectance in the wavelengths of 620 to 750 nm to the total area of a diffuse reflectance in the entire measurement wavelength (a ratio of an area of a diffuse reflectance in the target wavelength range: DiR [%]), and a luminance of the colored glass substrate are shown in Tables 5 and 6. FIG. 2 shows a graph of a luminance with regards to DiR of Examples 1 to 10, F-1 and F-2. It has been found that in Examples 1 to 10, as shown in Tables 2 and 4 to 6 and FIG. 2, when a ratio of an area of a diffuse reflectance in the wavelengths of 620 to 750 nm that is important for a red color filter, to a total area of a diffuse reflectance in the entire measurement wavelength range (a ratio of an area of a diffuse reflectance in the target wavelength range: DiR [%]) is higher, then, a luminance of a color filter is higher. A luminance of a color filter could be controlled to be high by controlling a ratio of an area of a diffuse reflectance in the wavelengths of 620 to 750 nm that is important for a red color filter, to a total area of a diffuse reflectance in the entire measurement wavelength range to be high. Furthermore, it has been found that DiR and a luminance of a color filter can be controlled to be high, in the PR 254 microparticles in which at least a part of the surface of the PR 254 microparticles with silicon oxide prepared in Examples 8 to 10 and F-2, compared with the PR 254 microparticles not coated with silicon oxide prepared in Examples 1 to 6 and F-1.

Examples 11 to 13, Example 14

Copper phthalocyanine (hereinafter referred to as CuPc) was used as the organic pigment. In Examples 11 to 13, a wet cake sample and dry powders of the silicon oxide coated CuPc microparticles were obtained in the same procedures as in Examples 8 to 10, except that the formulations of liquid A to liquid C were as shown in Table 7 and the operating conditions of the fluid processing apparatus were as shown in Table 8. In Example 14, a wet cake sample and dry powders of the silicon oxide coated CuPc microparticles were obtained in the same procedures as in Examples 1 to 6, except that the formulations of liquid A and liquid B were as shown in Table 9, the operating conditions of the fluid processing apparatus were as shown in Table 10, and the processing member 10 was operated at a rotation speed of 1,130 rpm.

Regarding the chemical substances (including the substances represented by the chemical formula or abbreviations) set forth in Tables 7 and 9, acetic acid is acetic acid (purity>99.70/, Kanto Chemical Co., Inc.), TEOS is tetraethyl orthosilicate (Wako Pure Chemical Industries, Ltd.), 3-aminopropyldiethoxymethylsilane is 3-aminopropyldiethoxymethylsilane (purity>97.0%, Tokyo Chemical Industry Co., Ltd.), CuPc is PV FAST BLUE BG (Clariant Co., Ltd.), 97% $H_2SO_4$ is 97% concentrated sulfuric acid (Kishida Chemical Co., Ltd.), and 28% ammonia water was ammonia (Kishida Chemical Co., Ltd.). Pure water having a pH of 5.89 (29.3° C.) and conductivity of 0.79 S/cm was used.

Washing of the organic pigment microparticles (the silicon oxide coated CuPc microparticles or CuPc microparticles), measurement of a primary particle diameter of the organic pigment microparticles and calculation of the particle diameter (D), and measurement of a diffuse reflectance of the organic pigment microparticles, were performed in the same manner as in Examples 1 to 6. The results are shown in Tables 8 and 10.

TABLE 7

| | | | Raw material | wt % |
|---|---|---|---|---|
| Examples 11 to 13 | 1st fluid | Liquid A | Acetic acid | 2.00 |
| | | | TEOS | 0.20 |
| | | | 3-aminopropyldiethoxy-methylsilane | 0.06 |
| | | | Pure water | 97.74 |
| | 2nd fluid | Liquid B | CuPc | 3.00 |
| | | | 97% $H_2SO_4$ | 97.00 |
| | 3rd fluid | Liquid C | 28% aqeous ammonia | 100.00 |

The FT-IR measurement, the XRD measurement, and the STEM observation were performed for the silicon oxide coated CuPc microparticles produced in Examples 11 to 13 in the same manner as in Examples 8 to 10. In the FT-IR measurement, a peak derived from silicon oxide was observed in the vicinity of 1,100 $cm^{-1}$, but in the XRD measurement, peaks derived from silicon oxide could not be confirmed. In STEM observation, no crystal lattice derived from silicon oxide was confirmed. From the above results, it was confirmed that the silicon oxide of the silicon oxide coated CuPc microparticles was amorphous.

Further, with respect to the silicon oxide coated CuPc microparticles prepared in Examples 11 to 13, mapping and quantification of elements using STEM (scanning transmission electron microscopy) were performed in the same manner as in Examples 8 to 10. Regarding one particle observed in the dark field image (HADDF image), distribution of silicons (Si) and oxygens (O) was observed in the entire particle, and distribution of copper (Cu) derived from copper phthalocyanine was observed in an area narrower than the area where silicons (Si) and oxygens (O) were observed. From this observation, it is considered that the silicon oxide coated CuPc microparticles obtained in Examples 11 to 13 are in a state where the entire surface of the CuPc microparticles is coated with silicon oxide.

Example 15

As Example 15, CuPc microparticles were prepared by pulverizing CuPc raw material (PV FAST BLUE BG (Clariant Co., Ltd.)) for preparing the silicon oxide coated CuPc microparticles or CuPc microparticles up to a particle diameter similar to that in Examples 11 to 14, using a bead mill in the same manner as in Examples 11 to 14. Measurement of a primary particle diameter of the obtained CuPc microparticles and calculation of the particle diameter (D), and measurement of a diffuse reflectance of the obtained

TABLE 8

| | Introduction flow rate [ml/min] | | | Introduction temperature (liquid sending temperature) [° C.] | | | Introduction pressure (liquid sending pressure) [MPaG] | | | Discharged liquid | | Particle diameter | | |
|---|---|---|---|---|---|---|---|---|---|---|---|---|---|---|
| Example | Liquid A | Liquid B | Liquid C | Liquid A | Liquid B | Liquid C | Liquid A | Liquid B | Liquid C | pH | Temperature [° C.] | (D) [nm] | DiR [%] | Luminance [—] |
| 11 | 450 | 50 | 100 | 7 | 25 | 25 | 0.099 | 0.1 | 0.1 | 5.41 | 25.1 | 21.2 | 33.46 | 132.40 |
| 12 | 450 | 40 | 120 | 7 | 25 | 25 | 0.099 | 0.1 | 0.1 | 9.12 | 25.1 | 20.6 | 36.41 | 136.40 |
| 13 | 450 | 35 | 125 | 7 | 25 | 25 | 0.1 | 0.1 | 0.1 | 9.34 | 25.1 | 21.2 | 37.64 | 138.70 |
| 15 | — | — | — | — | — | — | — | — | — | — | — | 19.5 | 28.30 | 100 (standard) |

TABLE 9

| | | | Raw material | wt % |
|---|---|---|---|---|
| Example 14 | 1st fluid | Liquid A | Pure water | 100.00 |
| | 2nd fluid | Liquid B | CuPc | 3.00 |
| | | | 97% $H_2SO_4$ | 97.00 |

TABLE 10

| | Introduction flow rate [ml/min] | | Introduction temperature (liquid sending temperature) [° C.] | | Introduction pressure (liquid sending pressure) [MPaG] | | | Discharged liquid | | Particle diameter | | |
|---|---|---|---|---|---|---|---|---|---|---|---|---|
| Example | Liquid A | Liquid B | Liquid A | Liquid B | Liquid A | Liquid B | pH | Temperature [° C.] | (D) [nm] | DiR [%] | Luminance [—] |
| 14 | 450 | 50 | 7 | 25 | 0.099 | 0.1 | <1 | — | 18.6 | 31.68 | 118.90 |
| 15 | — | — | — | — | — | — | — | — | 19.5 | 28.30 | 100 (standard) |

CuPc microparticles, were performed in the same manner as in Example 7. The results are shown in Tables 8 and 10.

For measuring a luminance as a color filter, an organic pigment microparticle dispersion and a cured film (a coating film) were prepared using the silicon oxide coated CuPc microparticles or the CuPc microparticles obtained in Examples 11 to 15. Specifically, 24.32 parts by weight of the dry powders of the silicon oxide coated CuPc microparticles or CuPc microparticles obtained in Examples 11 to 15, 28.80 parts by weight of "BYK-LNP-21116" (solid content concentration 40.0 wt %, BYK Chemie Japan) as the resin type dispersing agent, 25.60 parts by weight of a vinyl ester resin "Ripoxy SPC-2000" (solid content concentration: 35 wt %, Showa Denko K.K.) as a resin type dispersing agent, and 80.00 parts by weight of a propylene glycol monomethyl ether acetate (hereinafter referred to as "PGMEA") as the dispersion medium, were subjected to a dispersion treatment using CLEAMIX DOUBLE MOTION (CLM-2.2/3.7W, M Technique Co., Ltd.) at 20,000 rpm of a rotor, and 18,000 rpm of a screen for 1 hour, to obtain an organic pigment microparticle dispersion. To 60 parts by weight of the obtained organic pigment microparticle dispersion, were added 10 parts by weight of a photosensitive monomer (product name: A-DPH, Shin-Nakamura Chemical Co., Ltd.), 1.5 parts by weight of a photopolymerization initiator (4,4'-bis(dimethylamino)benzophenone, Wako Pure Chemical Industries, Ltd.), 32 parts by weight of a resin type dispersing agent (Ripoxy SPC-2000), 45 parts by weight of PGMEA, and 30 parts by weight of a propylene glycol monomethyl ether (PGME), to prepare a spin coating solution as a resin composition.

The obtained spin coating solution was applied on a glass substrate having a thickness of 1 mm and a 100 mm square with a spin coater "Spin Coater MS-150A" (Mikasa Co., Ltd.) so as to obtain the desired chromaticity (y=0.120), and then dried (pre-baked) at 90° C. for 2 minutes 30 seconds in a dryer, and further dried (post-baked) at 230° C. for 30 minutes in a drier, and cooled to obtain a colored glass plate (a color filter) of Examples 11 to 15. A luminance of the colored glass substrate was measured in the same manner as in Examples 1 to 7.

Figure 3:
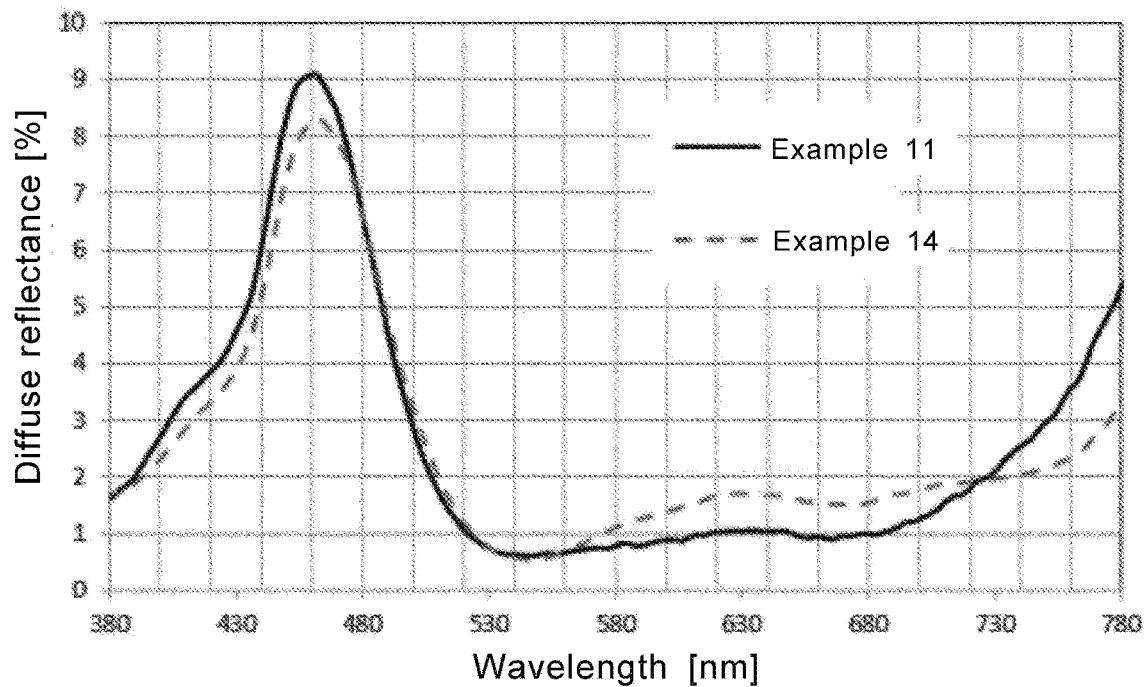
FIG. 3 shows a measurement result of a diffuse reflection spectrum of the copper phthalocyanine microparticle powders or the silicon oxide coated copper phthalocyanine microparticle powders obtained in Examples 11 and 14 of the present invention.
Figure 4:
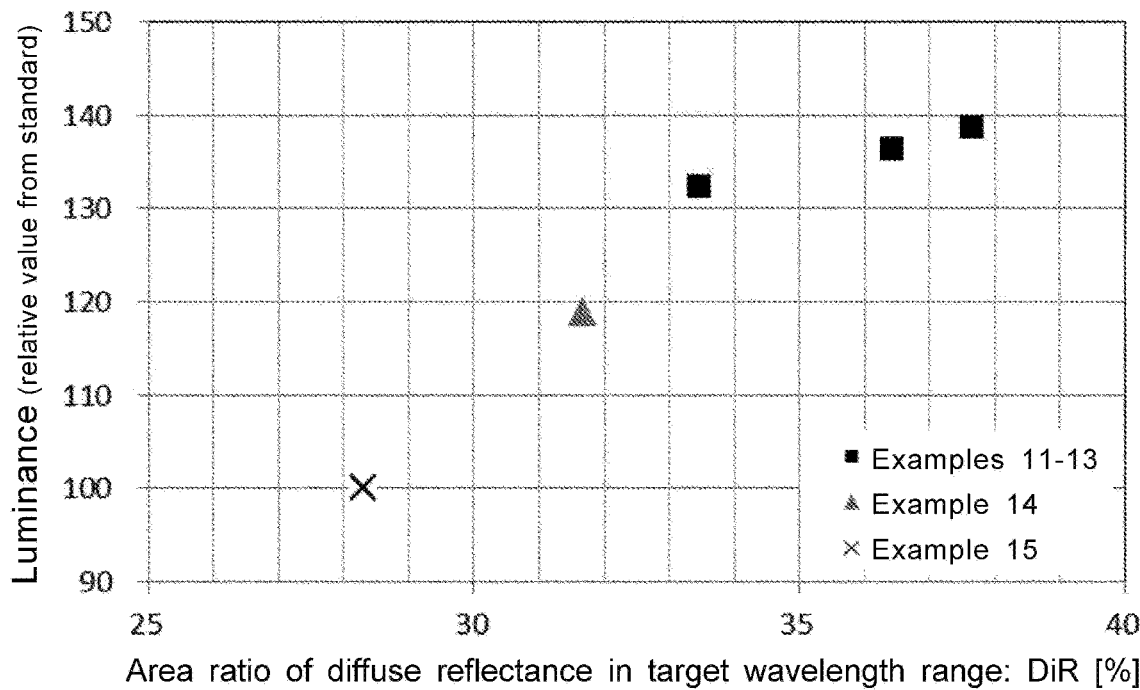
FIG. 4 shows a graph of a luminance in the color filter characteristic evaluation with regards to a ratio of an area of a diffuse reflectance in the target wavelength range (DiR) [%] of the copper phthalocyanine microparticle powders or the silicon oxide coated copper phthalocyanine microparticle powders obtained in Examples 11 to 15 of the present invention.

FIG. 3 shows a diffuse reflection spectrum measured in the wavelengths of 380 to 780 nm using the silicon oxide coated CuPc microparticle powders obtained under the condition in Example 11 and the powders of the CuPc microparticles obtained under the condition in Example 14. Based on the measurement results shown in FIG. 3, a ratio of an area of a diffuse reflectance in the wavelengths of 450 to 495 nm to the total area of a diffuse reflectance in the entire measurement wavelength (a ratio of an area of a diffuse reflectance in the target wavelength range: DiR [%]) was calculated, and shown in Tables 8 and 10 together with the luminance of the colored glass substrate. The silicon oxide coated CuPc microparticles and the CuPc microparticles obtained in Examples 12 to 13 and 15 were also subjected to the same measurement and calculation, and the results are shown in Tables 8 and 10. Luminances of Examples 11 to 14 in Tables 8 and 10 are shown as relative values as compared to the luminance of the colored glass plate of Example 15 as a standard (100). FIG. 4 shows a graph of luminances versus DiR of Examples 11 to 15.

It has been found that as shown in Tables 8 and 10 and FIG. 4, when a ratio of an area of a diffuse reflectance in the wavelengths of 450 to 495 nm that is important for a blue color filter, to a total area of a diffuse reflectance in the entire measurement wavelength range (a ratio of an area of a diffuse reflectance in the target wavelength range: DiR [%]) is higher, then, a luminance of a color filter is higher. A luminance of a color filter could be controlled to be high by controlling a ratio of an area of a diffuse reflectance in the wavelengths of 450 to 495 nm that is important for a blue color filter, to a total area of a diffuse reflectance in the entire measurement wavelength range to be high. Furthermore, it has been found that DiR and a luminance of a color filter can be controlled to be high, in the CuPc microparticles in which at least a part of the surface of the CuPc microparticles with silicon oxide prepared in Examples 11 to 13, compared with the CuPc microparticles not coated with silicon oxide prepared in Example 14. Even in the case of using CuPc as a raw material of the organic pigment microparticles, CuPc microparticles and CuPc microparticles in which at least a part of the surface of the CuPc microparticles is coated with silicon oxide, can be prepared using the apparatus described in JP 2009-112892, in the same manner as in Examples 8 to 10. Even in this case, DiR and a luminance of a color filter can be controlled to be high, in the CuPc microparticles in which at least a part of the surface of the CuPc microparticles is coated with silicon oxide, compared with the CuPc microparticles not coated with silicon oxide.

Examples 16 to 18, Example 19

Brominated chlorinated zinc phthalocyanine (C. I. Pigment Green 58, PG 58) was used as the organic pigment. In Examples 16 to 18, a wet cake sample and dry powders of silicon oxide coated PG 58 microparticles were obtained in the same procedures as in Examples 8 to 10, except that the formulations of liquid A to liquid C were as shown in Table 11 and the operating conditions of the fluid processing apparatus were as shown in Table 12. In Example 19, a wet cake sample and dry powders of silicon oxide coated PG 58 microparticles were obtained in the same manner as in Examples 1 to 6, except that the formulations of liquid A and liquid B were as shown in Table 13, the operating conditions of the fluid processing apparatus were as shown in Table 14, and the processing member 10 was operated at a rotation speed of 1,130 rpm.

Regarding the chemical substances (including the substances represented by the chemical formula or abbreviations) set forth in Tables 11 and 13, acetic acid is acetic acid (purity>99.7%, Kanto Chemical Co., Inc.), TEOS is tetraethyl orthosilicate (Wako Pure Chemical Industries, Ltd.), 3-aminopropyldiethoxymethylsilane is 3-aminopropyldiethoxymethylsilane (purity>97.0%, Tokyo Chemical Industry Co., Ltd.), 97% $H_2SO_4$ is 97% concentrated sulfuric acid (Kishida Chemical Co., Ltd.), 30 wt % $SO_3$ fuming sulfuric acid is 30% fuming sulfuric acid (Kanto Chemical Co., Inc.), chlorosulfuric acid is chlorosulfuric acid (Kanto Chemical Co., Inc.), and 28% ammonia water was ammonia (Kishida Chemical Co., Ltd.). Pure water having a pH of 5.89 (29.3° C.) and conductivity of 0.79 μS/cm was used.

Washing of the organic pigment microparticles (the silicon oxide coated PG 58 microparticles or PG 58 microparticles), measurement of a primary particle diameter of the organic pigment microparticles and calculation of the particle diameter (D), and measurement of a diffuse reflectance of the organic pigment microparticles, were performed in the same manner as in Examples 1 to 6. The results are shown in Tables 12 and 14.

TABLE 11

|  |  |  | Raw material | wt % |
|---|---|---|---|---|
| Examples 16 to 18 | 1st fluid | Liquid A | Acetic acid | 2.00 |
|  |  |  | TEOS | 0.20 |
|  |  |  | 3-aminopropyldiethoxy-methylsilane | 0.06 |
|  |  |  | Pure water | 97.74 |
|  | 2nd fluid | Liquid B | PG58 | 2.00 |
|  |  |  | 97% $H_2SO_4$ | 29.85 |
|  |  |  | 30 wt % $SO_3$ fuming sulfuric acid | 67.15 |
|  |  |  | Chlorosulfonic acid | 1.00 |
|  | 3rd fluid | Liquid C | 28% aqeous ammonia | 100.00 |

TABLE 12

| Example | Introduction flow rate [ml/min] | | | Introduction temperature (liquid sending temperature) [° C.] | | | Introduction pressure (liquid sending pressure) [MPaG] | | | Discharged liquid | | Particle diameter | | |
|---|---|---|---|---|---|---|---|---|---|---|---|---|---|---|
|  | Liquid A | Liquid B | Liquid C | Liquid A | Liquid B | Liquid C | Liquid A | Liquid B | Liquid C | pH | Temperature [° C.] | (D) [nm] | DiR [%] | Luminance [—] |
| 16 | 450 | 45 | 110 | 7 | 25 | 25 | 0.098 | 0.1 | 0.1 | 5.33 | 25.6 | 20.4 | 59.53 | 123.40 |
| 17 | 450 | 35 | 125 | 7 | 25 | 25 | 0.102 | 0.1 | 0.1 | 8.94 | 25.6 | 20.1 | 63.14 | 125.42 |
| 18 | 450 | 30 | 135 | 7 | 25 | 25 | 0.111 | 0.1 | 0.1 | 9.99 | 26.1 | 19.5 | 55.85 | 117.50 |
| 20 | — | — | — | — | — | — | — | — | — | — | — | 19.5 | 48.02 | 100 (standard) |

TABLE 13

|  |  |  | Raw material | wt % |
|---|---|---|---|---|
| Example 19 | 1st fluid | Liquid A | Pure water | 100.00 |
|  | 2nd fluid | Liquid B | PG58 | 2.00 |
|  |  |  | 97% $H_2SO_4$ | 29.85 |
|  |  |  | 30 wt % $SO_3$ fuming sulfuric acid | 67.15 |
|  |  |  | Chlorosulfonic acid | 1.00 |

TABLE 14

| Example | Introduction flow rate [ml/min] | | Introduction temperature (liquid sending temperature) [° C.] | | Introduction pressure (liquid sending pressure) [MPaG] | | Discharged liquid | | Particle diameter | | |
|---|---|---|---|---|---|---|---|---|---|---|---|
|  | Liquid A | Liquid B | Liquid A | Liquid B | Liquid A | Liquid B | pH | Temperature [° C.] | (D) [nm] | DiR [%] | Luminance [—] |
| 19 | 450 | 50 | 7 | 25 | 0.097 | 0.1 | <1 | — | 19.1 | 51.78 | 111.10 |
| 20 | — | — | — | — | — | — | — | — | 19.5 | 48.02 | 100 (standard) | fication of elements using STEM (scanning transmission electron microscopy) were performed in the same manner as in Examples 8 to 10. Regarding one particle observed in the dark field image (HADDF image), distribution of silicons (Si) and oxygens (O) was observed in the entire particle, and distribution of zinc (Zn) derived from brominated chlorinated zinc phthalocyanine was observed in an area narrower than the area where silicons (Si) and oxygens (O) were observed. From this observation, it is considered that the silicon oxide coated PG 58 microparticles obtained in Examples 16 to 18 are in a state where the entire surface of the PG 58 microparticles is coated with silicon oxide.

Example 20

As Example 20, PG 58 microparticles were prepared by pulverizing the PG 58 raw material for preparing the silicon oxide coated PG 58 microparticles or PG 58 microparticles up to a particle diameter similar to that in Examples 16 to 19, using a bead mill in the same manner as in Examples 16 to 19. Measurement of a primary particle diameter of the obtained PG 58 microparticles and calculation of the particle diameter (D), and measurement of a diffuse reflectance of the obtained PG 58 microparticles, were performed in the same manner as in Example 7. The results are shown in Tables 12 and 14.

The FT-IR measurement, the XRD measurement, and the STEM observation were performed for the silicon oxide coated PG 58 microparticles produced in Examples 16 to 18 in the same manner as in Examples 8 to 10. In the FT-IR measurement, a peak derived from silicon oxide was observed in the vicinity of 1,100 cm$^{-1}$, but in the XRD measurement, peaks derived from silicon oxide could not be confirmed. In STEM observation, no crystal lattice derived from silicon oxide was confirmed. From the above results, it was confirmed that the silicon oxide of the silicon oxide coated PG 58 microparticles was amorphous.

With respect to the silicon oxide coated PG 58 microparticles prepared in Examples 16 to 18, mapping and quantification For measuring a luminance as a color filter, an organic pigment microparticle dispersion and a cured film (a coating film) were prepared using the silicon oxide coated PG 58 microparticles or PG 58 microparticles obtained in Examples 16 to 20. Specifically, 30.40 parts by weight of the dry powders of the silicon oxide coated PG 58 microparticles or PG 58 microparticles obtained in Examples 16 to 20, 21.02 parts by weight of "BYK-LNP-6919" (solid content concentration 60.9 wt %, BYK Chemie Japan) as the resin type dispersing agent, 27.43 parts by weight of a vinyl ester resin "Ripoxy SPC-2000" (solid content concentration: 35 wt %, Showa Denko K.K.) as a resin type dispersing agent, and 79.55 parts by weight of a propylene glycol monomethyl ether acetate (hereinafter referred to as "PGMEA") as the dispersion medium, were subjected to a dispersion treatment using CLEAMIX DOUBLE MOTION (CLM-2.2/3.7W, M Technique Co., Ltd.) at 20,000 rpm of a rotor, and 18,000 rpm of a screen for 1 hour, to obtain an organic pigment microparticle dispersion. To 60 parts by weight of the obtained organic pigment microparticle dispersion, were added 10 parts by weight of a photosensitive monomer "A-DPH" (Shin-Nakamura Chemical Co., Ltd.), 1.5 parts by weight of a photopolymerization initiator (4,4'-bis(dimethylamino)benzophenone, Wako Pure Chemical Industries, Ltd.), 32 parts by weight of a resin type dispersing agent (Ripoxy SPC-2000), 45 parts by weight of PGMEA, and 30 parts by weight of a propylene glycol monomethyl ether (PGME), to prepare a spin coating solution as a resin composition.

The obtained spin coating solution was applied on a glass substrate having a thickness of 1 mm and a 100 mm square with a spin coater "Spin Coater MS-150A" (Mikasa Co., Ltd.) so as to obtain the desired chromaticity (y=0.500), and then dried (pre-baked) at 90° C. for 2 minutes 30 seconds in a dryer, and further dried (post-baked) at 230° C. for 30 minutes in a drier, and cooled to obtain a colored glass plate (a color filter) of Examples 16 to 20. A luminance of the colored glass substrate was measured in the same manner as in Examples 1 to 7.

Figure 5:
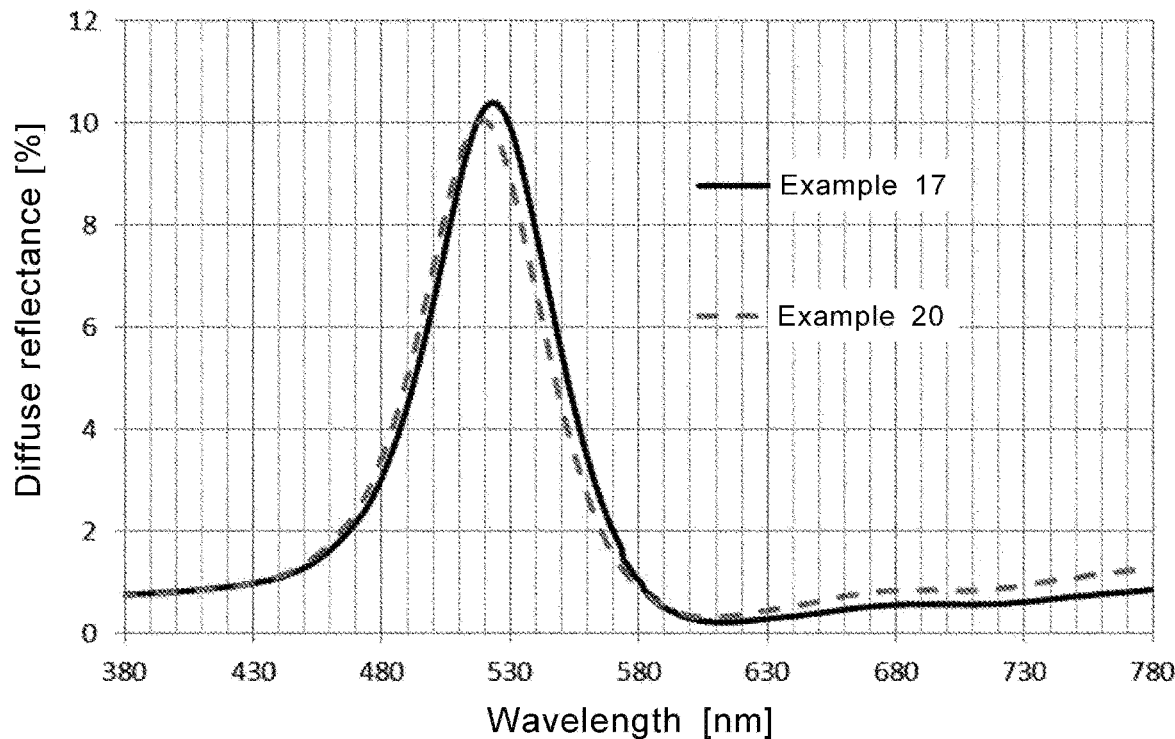
FIG. 5 shows a measurement result of a diffuse reflection spectrum of the PG 58 microparticle powders or the silicon oxide coated PG 58 microparticle powders obtained in Examples 17 and 20 of the present invention.
Figure 6:
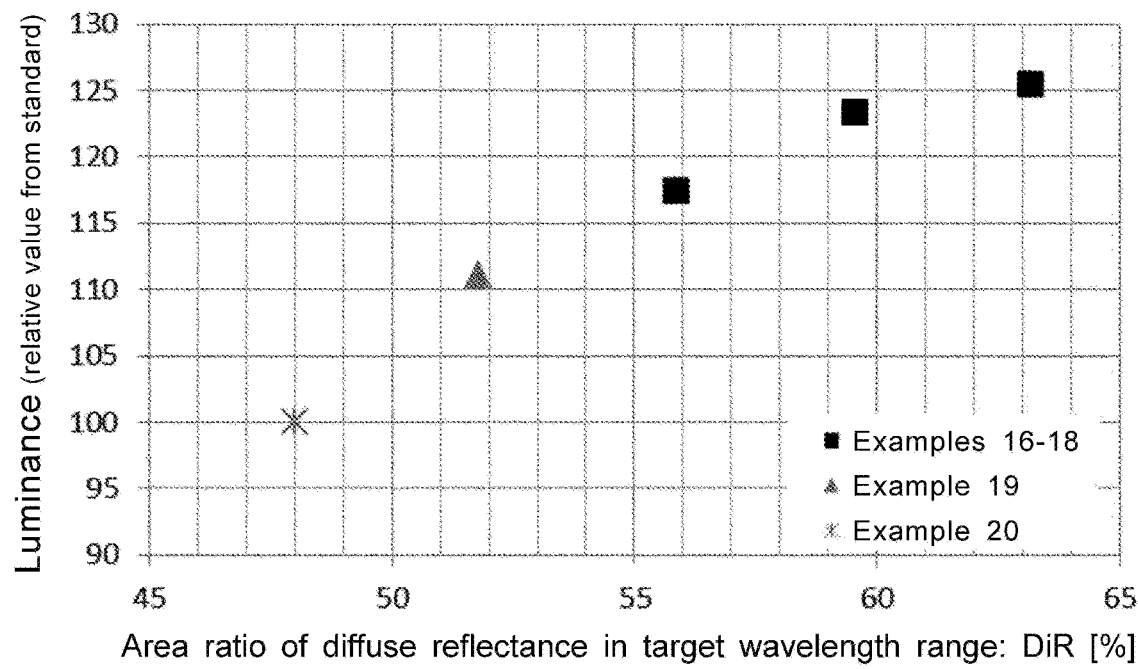
FIG. 6 shows a graph of a luminance in the color filter characteristic evaluation with regards to a ratio of an area of a diffuse reflectance in the target wavelength range (DiR) [%] of the PG 58 microparticle powders or the silicon oxide coated PG 58 microparticle powders obtained in Examples 16 to 20 of the present invention.

FIG. 5 shows a diffuse reflection spectrum measured in the wavelengths of 380 to 780 nm using the powders of the silicon oxide coated PG 58 microparticles obtained under the condition in Example 17 and the powders of the PG 58 microparticles obtained under the condition in Example 20. Based on the measurement results shown in FIG. 5, a ratio of an area of a diffuse reflectance in the wavelengths of 495 to 780 nm to the total area of a diffuse reflectance in the entire measurement wavelength (a ratio of an area of a diffuse reflectance in the target wavelength range (DiR) [%]) was calculated, and shown in Tables 12 and 14 together with the luminance of the colored glass substrate. The silicon oxide coated PG 58 microparticles and PG 58 microparticles obtained in Examples 16 and 18 to 19 were also subjected to the same measurement, and the results are shown in Tables 10 and 12. Luminances of Examples 16 to 19 in Tables 12 and 14 are shown as relative values as compared to a luminance of the colored glass plate of Example 20 as a standard (100). FIG. 6 shows a graph of luminances versus DiR of Examples 16 to 20.

It has been found that as shown in Tables 12 and 14 and FIG. 6, when a ratio of an area of a diffuse reflectance in the wavelengths of 495 to 570 nm that is important for a green color filter, to a total area of a diffuse reflectance in the entire measurement wavelength range (a ratio of an area of a diffuse reflectance in the target wavelength range: DiR [%]) is higher, then, a luminance of a color filter is higher. A luminance of a color filter could be controlled to be high by controlling a ratio of an area of a diffuse reflectance in the wavelengths of 495 to 570 nm that is important for a green color filter, to a total area of a diffuse reflectance in the entire measurement wavelength range to be high. Furthermore, it has been found that DiR and a luminance of a color filter can be controlled to be high, in the CuPc microparticles in which at least a part of the surface of the PG 58 microparticles with silicon oxide prepared in Examples 16 to 18, compared with the PG 58 microparticles not coated with silicon oxide prepared in Example 19. Even in the case of using PG 58 as a raw material of the organic pigment microparticles, PG 58 microparticles and PG 58 microparticles in which at least a part of the surface of the PG 58 microparticles is coated with silicon oxide, can be prepared using the apparatus described in JP 2009-112892, in the same manner as in Examples 8 to 10. Even in this case, DiR and a luminance of a color filter can be controlled to be high, in the PG 58 microparticles in which at least a part of the surface of the PG 58 microparticles is coated with silicon oxide, compared with the PG 58 microparticles not coated with silicon oxide.

The invention claimed is:

1. Organic pigment microparticles for a color filter, comprising: the organic pigment microparticles selected from the group consisting of the following (a), (b), and (c):
   (a) the organic pigment microparticles are microparticles of C. I. Pigment Red 254,
   a ratio of an area of a diffuse reflectance in a target wavelength range to a total area of a diffuse reflectance in the entire measurement wavelength range is 71% or more, in a diffuse reflection spectrum of the organic pigment microparticles in the wavelength range of 380 to 780 nm, and the target wavelength range is 620 to 750 nm;
   (b) the organic pigment microparticles are microparticles of copper phthalocyanine,
   a ratio of an area of a diffuse reflectance in a target wavelength range to a total area of a diffuse reflectance in the entire measurement wavelength range is 30% or more, in a diffuse reflection spectrum of the organic pigment microparticles in the wavelength range of 380 to 780 nm, and the target wavelength range is 450 to 495 nm; and
   (c) the organic pigment microparticles are microparticles of brominated chlorinated zinc phthalocyanine,
   a ratio of an area of a diffuse reflectance in a target wavelength range to a total area of a diffuse reflectance in the entire measurement wavelength range is 51% or more, in a diffuse reflection spectrum of the organic pigment microparticles in the wavelength range of 380 to 780 nm, and the target wavelength range is 495 to 570 nm;
   wherein at least a part of the surface of the organic pigment microparticles is coated with silicon oxide,
   the particle diameter of the oxide coated organic pigment microparticles is 100.5% or more and 190% or less relative to the primary particle diameter of the organic pigment microparticles,
   a primary particle diameter of the organic pigment microparticles is 100 nm or less, and the organic pigment microparticles are in a substantially spherical shape, and
   wherein the diffuse reflectance of the organic pigment microparticles is controlled for the purpose of improving a luminance of a color filter.

2. The organic pigment microparticles for a color filter according to claim 1, wherein the silicon oxide contains an amorphous silicon oxide.

3. A color filter comprising the organic pigment microparticles for a color filter according to claim 1.

4. A color filter comprising the organic pigment microparticles for a color filter according to claim 1 and organic pigment microparticles having a color different from the color of the organic pigment microparticles.

5. The color filter according to claim 3, wherein the color filter has both high diffuse reflectance and high luminance, compared with a color filter obtained using bead milled organic pigment microparticles.

6. A method of producing the organic pigment composition according to claim 1, comprising: coating at least a part of the surface of the organic pigment microparticles with silicon oxide.

7. The method of producing an organic pigment composition according to claim 6, wherein the luminance of the color filter is controlled to be high, by controlling a ratio of an area of the diffuse reflectance in a target wavelength range to an total area of the diffuse reflectance in the entire measurement wavelength range in a diffuse reflection spectrum of the organic pigment microparticles in the wavelength range of 380 to 780 nm, to be high.

8. The method of producing an organic pigment composition according to claim 7, wherein the diffuse reflection spectrum is measured using powders of the organic pigment microparticles.

9. The method of producing an organic pigment composition according to claim 7,
wherein the organic pigment microparticles are microparticles of C. I. Pigment Red 254,
the target wavelength range is 620 to 750 nm, and
the ratio of an area of the diffuse reflectance in the target wavelength range to a total area of the diffuse reflectance in the entire measurement wavelength range is 71% or more.

10. The method of producing an organic pigment composition according to claim 7,
wherein the organic pigment microparticles are microparticles of copper phthalocyanine,
the target wavelength range is 450 to 495 nm, and
the ratio of an area of the diffuse reflectance in the target wavelength range to a total area of the diffuse reflectance in the entire measurement wavelength range is 30% or more.

11. The method of producing an organic pigment composition according to claim 7,
wherein the organic pigment microparticles are microparticles of brominated chlorinated zinc phthalocyanine,
the target wavelength range is 495 to 570 nm, and
the ratio of an area of the diffuse reflectance in the target wavelength range to a total area of the diffuse reflectance in the entire measurement wavelength range is 51% or more.

12. The method of producing an organic pigment composition according to claim 6, wherein the silicon oxide contains an amorphous silicon oxide.

13. The method of producing an organic pigment composition according to claim 6, wherein the organic pigment composition is an organic pigment microparticle dispersion, and the method comprises the following steps (I) to (III):
Step (I) of obtaining at least one kind of organic pigment microparticles;
Step (II) of measuring a diffuse reflectance of the organic pigment microparticles; and
Step (III) of dispersing the organic pigment microparticles in a solvent to obtain the organic pigment microparticle dispersion.

14. A method of producing a coating film, wherein the coating film is prepared using the organic pigment microparticle dispersion obtained by the method of producing an organic pigment composition according to claim 13, and a luminance of the coating film is controlled.

15. The method of producing a coating film according to claim 14, wherein a luminance of the coating film is controlled by controlling a diffuse reflectance of the organic pigment microparticles.

16. The method of producing a coating film according to claim 14,
wherein a diffuse reflectance of powders of the organic pigment microparticles is measured, and the luminance of the coating film is evaluated by using the following relation obtained by the following steps (I) to (IV):
Step (I) of obtaining at least one kind of organic pigment microparticles;
Step (II) of measuring the diffuse reflectance of the powders of the organic pigment microparticles in the wavelength range of 380 to 780 nm;
Step (III) of dispersing the organic pigment microparticles in a solvent to obtain the organic pigment microparticle dispersion; and
Step (IV) of measuring a luminance of the coating film prepared using the organic pigment microparticle dispersion, to obtain the relation between the luminance of the coating film and a ratio of an area of the diffuse reflectance in the target wavelength range to a total area of the diffuse reflection in the entire measurement wavelength range.

17. A method of producing a color filter, comprising a step of forming the coating film on a substrate for a color filter, in the method of producing a coating film according to claim 14, to obtain the color filter whose luminance is controlled by controlling the diffuse reflectance of the organic pigment microparticles.

* * * * *